(12) United States Patent
Garceau et al.

(10) Patent No.: US 7,073,844 B2
(45) Date of Patent: Jul. 11, 2006

(54) SLIDABLE ROOM ASSEMBLY

(75) Inventors: Bernard F. Garceau, Granger, IN (US); James Young, Sr., Toluca, IL (US)

(73) Assignee: Norco Industries, Inc., Compton, CA (US)

( * ) Notice: Subject to any disclaimer, the term of this patent is extended or adjusted under 35 U.S.C. 154(b) by 74 days.

(21) Appl. No.: 10/668,038

(22) Filed: Sep. 22, 2003

(65) Prior Publication Data

Related U.S. Application Data

(63) Continuation of application No. 10/002,032, filed on Nov. 15, 2001, now Pat. No. 6,623,066, which is a continuation-in-part of application No. 09/897,762, filed on Jul. 2, 2001, now Pat. No. 6,644,719, which is a continuation of application No. 09/296,357, filed on Apr. 22, 1999, now Pat. No. 6,254,171.

(51) Int. Cl.
*B60R 27/00* (2006.01)

(52) U.S. Cl. .................. 296/165; 296/26.13

(58) Field of Classification Search ............ 296/26.13, 296/26.12, 26.08, 26.09, 26.04, 26.05, 165, 296/171, 175, 172; 52/67, 143
See application file for complete search history.

(56) References Cited

U.S. PATENT DOCUMENTS

| | | | |
|---|---|---|---|
| 1,972,415 A | 9/1934 | Anderson |
| 2,739,833 A | 3/1956 | Schenkel et al. |
| 2,744,781 A | 5/1956 | Black |
| 2,857,197 A | 10/1958 | Hogg |
| 2,877,509 A | 3/1959 | Klibanow |
| 2,898,143 A | 8/1959 | Ferrera |
| 2,898,144 A | 8/1959 | Ferrera |
| 2,902,312 A | 9/1959 | Ferrera |
| 2,987,342 A | 6/1961 | Meaker et al. |
| 3,341,986 A | 9/1967 | Brosig |
| 4,103,462 A | 8/1978 | Freller |
| 4,270,791 A | 6/1981 | Tann |
| 5,090,749 A | 2/1992 | Lee |
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,634,683 A | 6/1997 | Young |

(Continued)

FOREIGN PATENT DOCUMENTS

BE 523151 10/1953

(Continued)

*Primary Examiner*—Joseph D. Pape
(74) *Attorney, Agent, or Firm*—Hahn Loeser & Parks; Michael H. Minns

(57) ABSTRACT

A slidable room assembly comprises a vehicle body having an opening formed in an exterior wall, and a reciprocatable slideout unit or compartment disposed in the opening and slidable between a retracted position and an extended position. Sliding movement of the slideout unit is controlled by a drive mechanism that includes a pair of cables. A plurality of sheaves, rotatably mounted on the vehicle body about the opening, defines a path for the cable or cables. The drive cables have a double Y-shape whereby each cable has four ends with an end being connected to each corner of the slideout unit. Sliding movement of the slideout unit may be either motor driven or manually powered.

29 Claims, 14 Drawing Sheets

U.S. PATENT DOCUMENTS

| | | |
|---|---|---|
| 5,791,715 A | 8/1998 | Nebel |
| 5,800,002 A | 9/1998 | Tiedge et al. |
| 6,152,520 A | 11/2000 | Gardner |
| 6,254,171 B1 | 7/2001 | Young, Sr. |
| 6,536,821 B1 | 3/2003 | Gardner |
| 6,623,066 B1 | 9/2003 | Garceau et al. |
| 6,644,719 B1 | 11/2003 | Young, Sr. |

FOREIGN PATENT DOCUMENTS

| | | |
|---|---|---|
| CA | 2136673 | 3/1996 |
| DE | 1 095 137 B | 12/1960 |
| GB | 882258 | 11/1961 |

SLIDABLE ROOM ASSEMBLY

This application is a continuation of prior application Ser. No. 10/002,032 filed Nov. 15, 2001, now U.S. Pat. No. 6,623,066, which is a continuation-in-part of prior application Ser. No. 09/897,762, filed Jul. 2, 2001, now U.S. Pat. No. 6,644,719, which is a continuation of prior application Ser. No. 09/296,357, filed Apr. 22, 1999, now U.S. Pat. No. 6,254,171. Application Ser. Nos. 10/002,032, 09/897,762 and 09/296,357 are hereby incorporated by reference.

FIELD OF THE INVENTION

This invention relates to a slidable room assembly, particularly to a slidable room assembly for a vehicle having a slideout room or compartment that is retracted when the vehicle is in motion and may be extended to afford more room when the vehicle is parked. More particularly, this invention relates to a slidable room assembly that includes an improved mechanism for reciprocation of the slideout unit relative to the vehicle.

BACKGROUND OF THE INVENTION

Recreation vehicles including motor homes, fifth wheel trailers and travel trailers may be provided with an extendable slideout unit for increasing the vehicle's living space. This slideout unit may be extended for use when the vehicle is parked and is retracted in a telescoping manner when the vehicle is to be moved.

Prior vehicle slideout installations that include an extension/retraction system that relies on screws or a pinion for effecting telescoping movement of the slideout unit relative to the vehicle are known. Screws, in particular, must be short for practical reasons, including the tendency of a longer screw to deflect so that the axis of the screw is not absolutely straight. This, of course, greatly impairs operability of the screw. Pinions must also be comparatively short for practical reasons, including excessive weight in a pinion of greater length. Since the amplitude of movement of the slideout room or compartment can be no greater than the length of the screw or pinion, the amplitude of sliding movement, and hence the amount of additional space gained by the slideout compartment, is limited.

Other types of slideout installations for vehicles are also known. One such installation employs an endless cable that passes over one pair of pulleys supported by a main part of a mobile home and a second pair of pulleys mounted on side walls of an extension part of the mobile home to cause the extension part to reciprocate. Another slideout installation shows an expanding caravan, which also includes a rotatable shaft and two types of cables wound therearound. Rotation of the shaft in one direction causes one type of cable to wind as the other type unwinds, causing a sliding unit a second module to reciprocate in one direction (say outwardly) relative to first module. Rotation of the shaft in the opposite direction causes the second module to move in the opposite direction (say inwardly relative to the first module).

Presently known room slideout units have various problems.

A major problem is that a slideout room is cantilevered as it is extended. The outer end of the extended slideout room tends to tip downwardly. This puts weight on the slideout unit's operating mechanism. The cantilevered slideout room also tends to be loose at the top and tight at the bottom. This puts weight on the slideout mechanism, which in turn impairs slideability and also invites leakage.

Another problem with presently known slideout units is that they require modification of the vehicle's underframe, unless the slideout unit is of small size. For example, it may be necessary to cut away a portion of the underframe in order to accommodate the operating mechanism of the slideout unit. This impairs the ability of the underframe to support the vehicle by lessening the strength and rigidity of the underframe.

SUMMARY OF THE INVENTION

In one aspect of the present invention, this is accomplished by providing a slidable room comprising: two jambs, adapted to be attached to a vehicle about an opening in the vehicle, each jamb having: a plurality of pulleys thereon; and a drive cable therein, the drive cable comprising a central section, an interconnecting section extending from each end of the central section; and a plurality of room engaging sections extending from a free end of each interconnecting section, a free end of each room engaging section extending around at least one pulley and through the jamb, the central section and at least a portion of the interconnecting sections extending beyond an end of the jamb; a room, the room being adapted to be inserted into the vehicle opening and between the jambs, the free end of the drive cable room engaging sections being attached to the room; and a motor, the central section of the drive cable being operatively attached to the motor.

In another aspect of the present invention, this is accomplished by providing a slidable room comprising: two jambs, adapted to be attached to a vehicle about an opening in the vehicle, each jamb having: a plurality of pulleys thereon; and a plurality of cables therein, drive ends of the cables extending beyond an end of the jamb, room ends of the cables extending through the jamb; a room, the room being adapted to be inserted into the vehicle opening and between the jambs, the room ends of the cables being attached to the room; and a motor, the drive ends of the cables being operatively attached to the motor.

In another aspect of the present invention, this is accomplished by providing a jamb for attachment to a vehicle and for use with a slidable room adapted to be installed in an opening in the vehicle, the jamb comprising: an elongated jamb member adapted for attachment to the vehicle adjacent the vehicle opening; a plurality of pulleys rotatably attached to the elongated jamb member; and a drive cable within the elongated jamb member, the drive cable comprising a central section, an interconnecting section extending from each end of the central section; and two room engaging sections extending from a free end of each interconnecting section, a free end of each room engaging section extending around at least one pulley and through the jamb, the central section and at least a portion of the interconnecting sections extending beyond an end of the jamb.

In another aspect of the present invention, this is accomplished by providing a vehicle comprising: at least one wall having an opening therein; two jambs, each jamb having: a plurality of pulleys thereon; and a drive cable therein, the drive cable comprising a central section, an interconnecting section extending from each end of the central section; and a plurality of room engaging sections extending from a free end of each interconnecting section, a free end of each room engaging section extending around at least one pulley and through the jamb, the central section and at least a portion of the interconnecting sections extending beyond an end of the jamb, the jambs being attached about the opening of the at least one wall; a room inserted into the opening of the at least one wall and between the jambs, the room being reciprocable between an extended position and a retracted position, the free ends of the drive cable room engaging sections being attached to the room; and a motor attached to the at least one wall, the drive cable central sections being operatively attached to the motor.

In another aspect of the present invention, this is accomplished by providing a drive mechanism for a slidable room in a vehicle comprising: a pair of cables, each cable having a center section having two ends; and a pair of end sections attached to each center section end, each cable thereby having a double "Y"-shape.

In another aspect of the present invention, this is accomplished by providing a drive mechanism for a slidable room in a vehicle comprising: a pair of cables, each cable having a center section having two ends, a central portion of the center section being chain; and a pair of end sections attached to each center section end, each cable thereby having a double "Y"-shape, one end section of the pair of end sections being longer than the other end section of the pair of end sections.

In a further aspect of the present invention, this is accomplished by providing a method of reciprocating a slidable room mounted in a vehicle between a retracted position and an extended position, a plurality of flexible drive members being fixedly attached to sides of the slidable room, the method comprising: pulling on a first set of the flexible drive members while simultaneously reversing a second set of the flexible drive members to move the slidable room from the retracted position to the extended position; and pulling on the second set of the flexible drive members while simultaneously reversing the first set of the flexible drive members to move the slidable room from the extended position to the retracted position.

In another aspect of the present invention, this is accomplished by providing a method of reciprocating a slidable room mounted in a vehicle between a retracted position and an extended position, a plurality of pairs of flexible members being attached to the slidable room, each pair of flexible members comprising a short flexible member and a long flexible member, the method comprising: pulling on two first pairs of flexible members while simultaneously reversing two second pairs of flexible members to move the slidable room from the retracted position to the extended position; and pulling on the two second pairs of flexible members while simultaneously reversing the two first pairs of flexible members to move the slidable room from the retracted position to the extended position.

In yet a further aspect of the present invention, this is accomplished by providing a method of installing a drive mechanism for reciprocating a slidable room mounted in a vehicle between a retracted position and an extended position, the method comprising: providing four pairs of flexible drive members, one flexible drive member of each pair being shorter than the other flexible drive member of the same pair, each flexible drive member having a first end and a second end; attaching the second ends of the first pair of flexible drive members to an outside portion on a first side of the slidable room; attaching the second ends of the second pair of flexible drive members to an outside portion on a second side of the slidable room; attaching the second ends of the third pair of flexible drive members to an inside portion on the first side of the slidable room; and attaching the second ends of the fourth pair of flexible drive members to an inside portion on the second side of the slidable room.

In another aspect of the present invention, this is accomplished by providing a drive mechanism for reciprocating a slidable room mounted in a vehicle between a retracted position and an extended position, the drive mechanism comprising: a pair of flexible drive members, each pair of flexible drive members having a first cable and a second cable, the first cable being shorter than the second cable; and a driver connected to each pair of flexible drive members, wherein the driver has two ends, one pair of flexible driver members being connected on one end of the driver and the other pair of flexible drive members being connected to the other end of the driver.

In a further aspect of the present invention, this is accomplished by providing a jamb for attachment to a vehicle and for use with a slidable room adapted to be installed in an opening in the vehicle, the jamb comprising: an elongated jamb member adapted for attachment to the vehicle adjacent the vehicle opening, the elongated jamb member having an upper part and a lower part; a plurality of pulleys rotatably attached to the elongated jamb member; and two pairs of cables, each cable extending around at least one pulley and extending outward through the elongated jamb member.

In a further aspect of the present invention, this is accomplished by providing a drive mechanism for reciprocating a slidable room mounted in a vehicle between a retracted position and an extended position, the drive mechanism comprising: a pair of drive members, each drive member comprising a central reciprocable driver having two ends; and a pair of flexible members attached to each central reciprocable driver end, each drive member thereby having a double "Y"-shape, the central reciprocable driver being reciprocable between a first position corresponding to the retracted position and a second position corresponding to the extended position.

In another aspect of the present invention, this is accomplished by providing a vehicle comprising: at least one wall having an opening therein; a room inserted into the opening of the at least one wall, the room being reciprocable between an extended position and a retracted position; two sets of flexible drive members attached to the room; a plurality of anchors fixedly securing each set of the flexible drive members to the room; a driver reciprocating the two sets of flexible drive members moving the room between the extended position and the retracted position; and a lock preventing movement of the room when the room is stationary.

In a further aspect of the present invention, this is accomplished by providing a vehicle comprising: at least one wall having an opening therein; a room inserted into the opening of the at least one wall, the room being reciprocable between an extended position and a retracted position; two sets of flexible drive members, one set being associated with a first side of the room, the other set being associated with an opposite side of the room; a plurality of anchors fixedly securing the flexible drive members to the room, the plurality of anchors comprising vertically spaced apart anchors fixedly securing each set of flexible drive members to the room.

In a further aspect of the present invention, this is accomplished by providing a vehicle comprising: at least one wall having an opening therein; a room inserted into the opening of the at least one wall, the room being reciprocable between an extended position and a retracted position, the room having a first side and a second side parallel to and offset from the first side; and two sets of flexible drive members, one set being associated with the first side of the room, the other set being associated with the second side of the room, each set of flexible drive members comprising: two pairs of flexible drive members, two flexible drive members extending in a first direction along a side of the room, two flexible drive members extending along the side of the room in a second direction opposite the first direction; and a plurality of anchors fixedly securing the flexible drive members to the room, one anchor being attached to an upper portion of an inside portion of the side of the room, one anchor being attached to a lower portion of the inside portion of the side of the room, one anchor being attached to an upper portion of an outside portion of the side of the room, and, one anchor being attached to a lower portion of the outside portion of the room.

The foregoing and other aspects will become apparent from the following detailed description of the invention when considered in conjunction with the accompanying drawing figures.

BRIEF DESCRIPTION OF THE DRAWINGS

This invention will now be described with particular reference to the accompanying drawings, in which.

DESCRIPTION OF THE PREFERRED EMBODIMENTS

Figure 1:
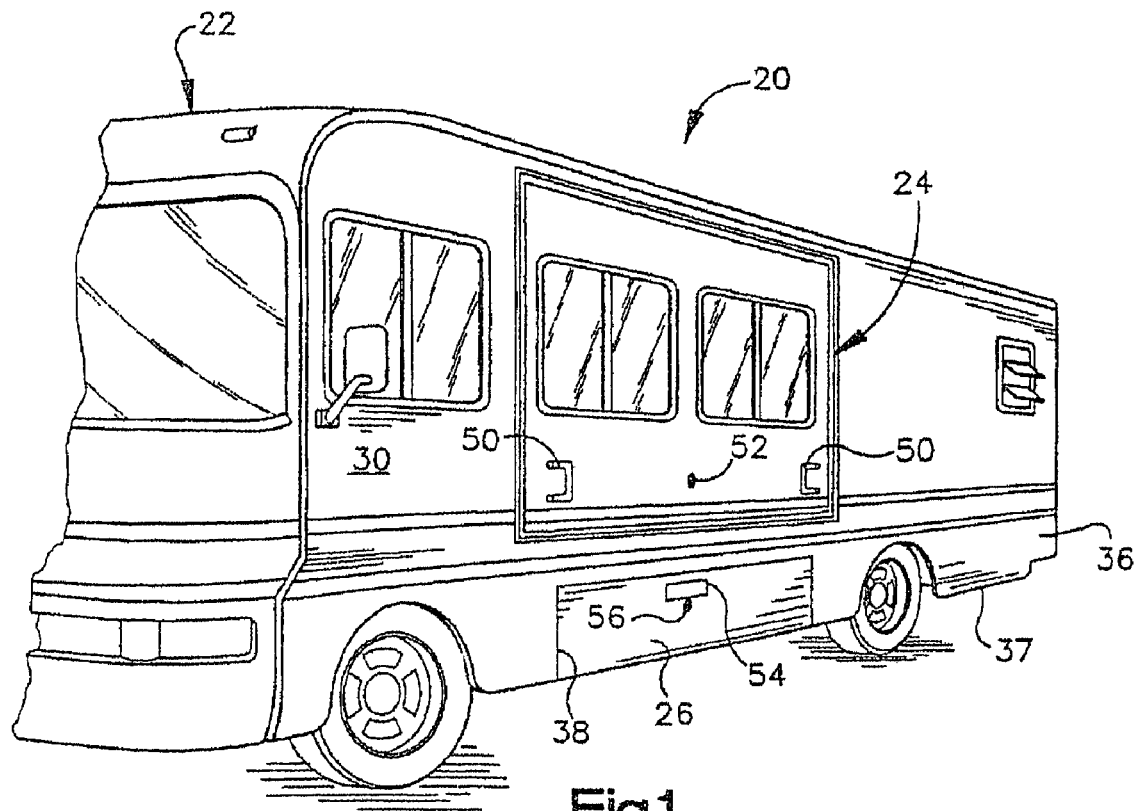
FIG. 1 is a partial perspective view of a recreational vehicle incorporating slideout units in accordance with the present invention, illustrating the slideout units in the retracted position.
Figure 2:
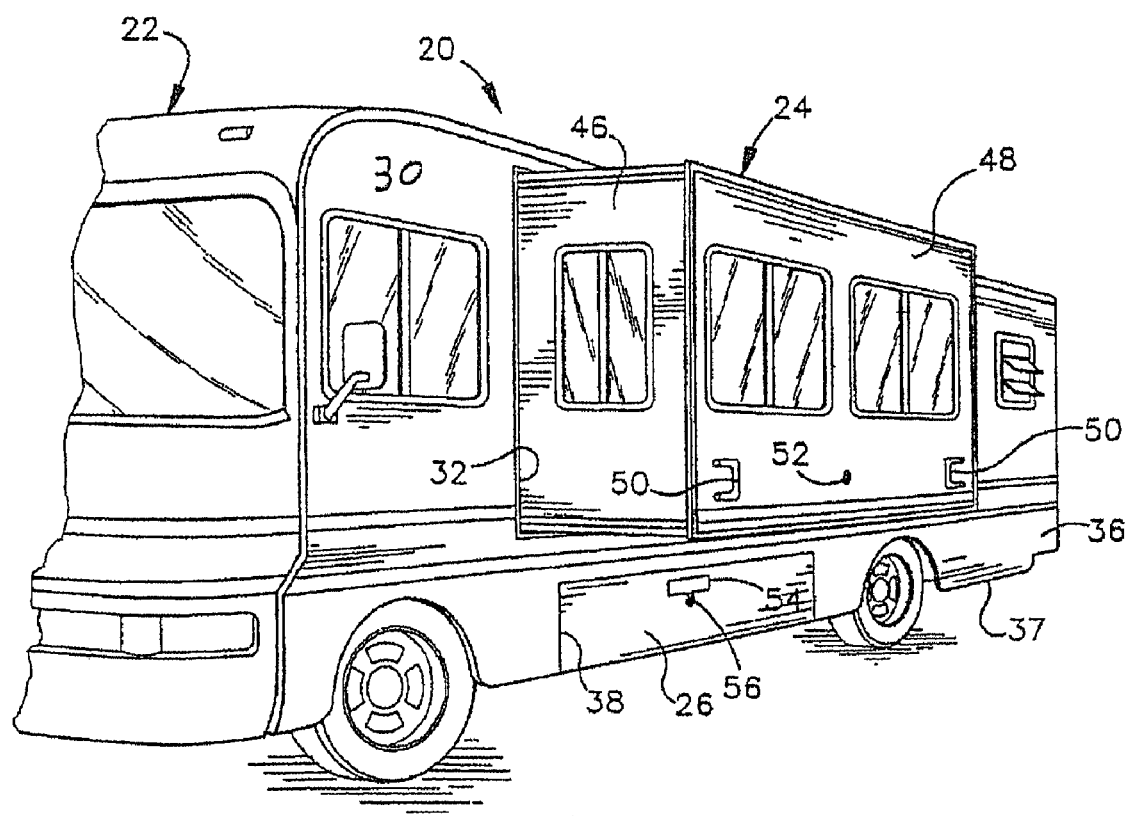
FIG. 2 is a perspective view of a recreational vehicle incorporating slideout units in accordance with the present invention, illustrating a slideout unit that forms a room extension in the extended position.
Figure 3:
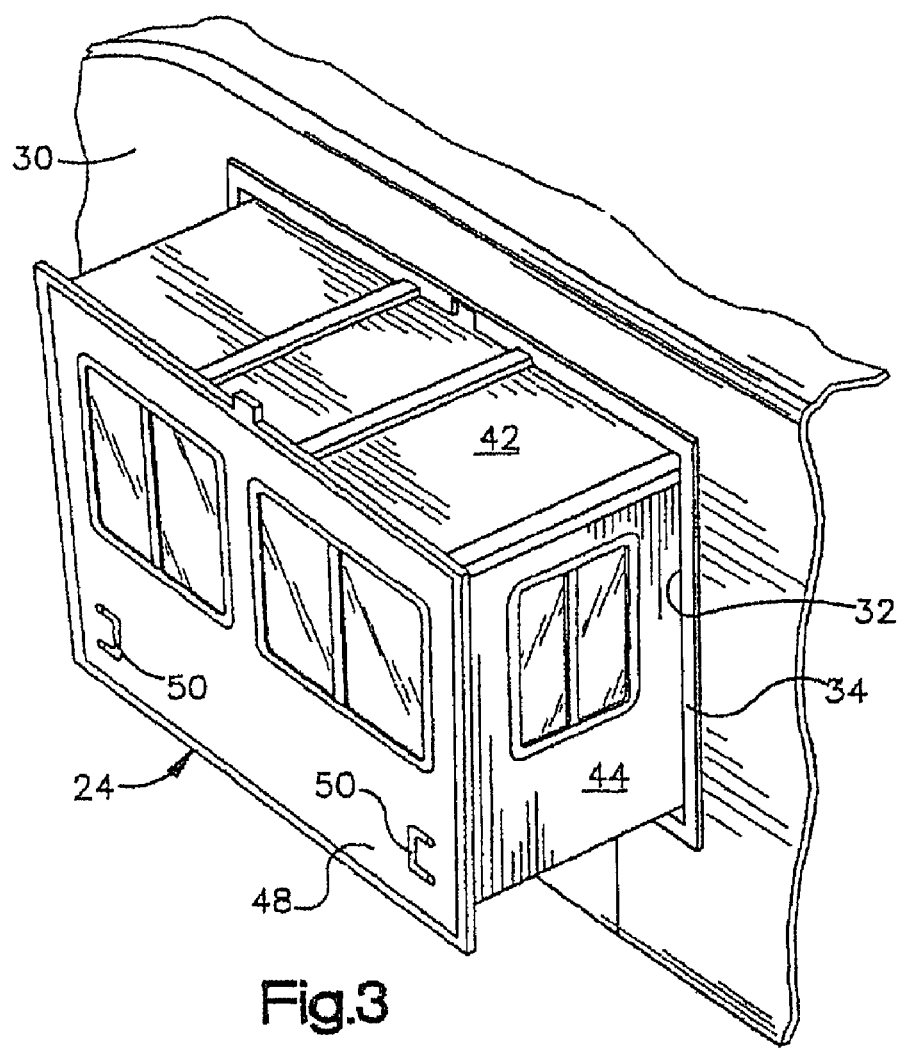
FIG. 3 is an upper partial perspective view of a recreational vehicle incorporating a slideout unit in accordance with the present invention; wherein a slideout unit forming a room extension is illustrated in the extended position.

Referring now to FIGS. 1 through 3, the present invention relates to a vehicle 20 comprising a vehicle body 22 (or base unit or first module) having one or more room slideout units (or second modules) 24 that is horizontally reciprocable relative to the vehicle body 22 between a retracted (or first) position shown in FIG. 1 and an extended (or second) position shown in FIGS. 2 and 3. The vehicle 20 can be a motor home, a fifth wheel trailer or a travel trailer. The slideout unit 24, when extended, affords more room or space to the interior of the vehicle. A novel actuation system or drive mechanism (or force transmitting mechanism), to be described later is provided for reciprocation of the slideout unit 24. This first slideout unit (room slideout unit or space-expanding slideout unit) 24, and the drive mechanism for reciprocating the slideout unit 24, together form a slidable room assembly.

The vehicle 20 may alternatively or further comprise one or more reciprocable storage slideout units 26, which may serve as storage compartments. This second or storage slideout unit 26, shown in a closed (or retracted) position in FIGS. 1 and 2, may be disposed in a lower portion of a side wall of vehicle body 22. The actuating system or drive mechanism for reciprocating the storage slideout unit 26 may be similar to that used to reciprocate room slideout unit 24, but may be smaller and less powerful (since a storage slideout unit 26 is much lighter than a room slideout unit 24) and may be positioned differently.

A vehicle 20 may have either one or more room slideout units 24, or one or more storage slideout units 26, or both. Thus, a vehicle 20 may have one or two storage slideout units 26 but no room slideout unit 24 if desired. Also, a vehicle may have either one or two room slideout units 24 but no storage slideout unit 26 if desired.

The vehicle 20 may be a self-powered vehicle, such as a recreational vehicle, or may be a trailer that is adapted to be towed, e.g., by an automobile or a truck tractor. The vehicle may be one that is designed for living (as a house trailer), or may be a work vehicle (e.g., a mobile library).

In any case, a vehicle 20 according to this invention comprises a vehicle body 22 having a plurality of exterior walls, e.g., a roof, a front wall, side walls, and a rear wall. The interior of vehicle body 22 also has a floor. Beneath the floor is an underframe (not shown) for supporting the vehicle body 22; the underframe may be conventional. At least one of the exterior walls, here shown as the left side wall 30, has an opening 32 therein for receiving the first reciprocable slideout unit 24. The opening 32 in the left side 30 of vehicle body 22 is preferably rectangular, as shown, and has a perimeter that includes horizontal top and bottom edges and vertical side edges. A fixed frame member 34, which may be metallic or rigid composite in its preferred form, encircles the perimeter of the opening 32. Each of the side walls 30 (only the left side wall is shown) has a lower portion or skirt 36, which is disposed below the floor of vehicle 20 and which terminates in a lower edge 37. One or both side walls 30 may have an opening 38, which is preferably rectangular, for receiving storage slideout unit 26. There may be any number of such openings 38 equal to the number of storage slideout units 26. These openings 38 may be in any location. Opening 38 preferably extends to the lower edge 37 of the side wall 30.

Both slideout units 24 and 26 should always be retracted, as shown in FIG. 1, when the vehicle is in motion. When the vehicle is parked or stationary, the room slideout unit 24 may be slid to the extended position shown in FIGS. 2 and 3, to afford additional room in the interior of the vehicle. Similarly the storage slideout unit 26 may be opened (i.e., moved to extended position) when the vehicle is at rest.

The room slideout unit 24 has the same cross-sectional shape as the opening 32 in the vehicle body 22, i.e., rectangular in the preferred embodiment shown. The slideout unit 24 may comprise a floor 40, a ceiling 42, left and right side walls 44 and 46, respectively (as seen from the interior of vehicle 20 looking out), and a forward or outside wall 48. The forward or outside wall 48 of the slideout unit 24 is substantially coincident with (and spaced slightly outwardly from) the left side wall 30 of the vehicle body 22 when the slideout unit 24 is retracted (FIG. 1), and is parallel to and spaced outwardly from the vehicle body side wall 30 when the slideout unit 24 is extended (FIG. 2). As described, the left side wall 44 of the slideout unit 24 is disposed in a rearward direction of the vehicle body 22, and the right side wall 46 of the slideout unit 24 is disposed in a forward direction of the vehicle body. The spacing between opposite side walls 44 and 46 (which are respective left and right hand walls) is just slightly less than the width of the opening 32 in the vehicle body 22, to afford enough clearance for sliding movement of the slideout unit 24 while minimizing the intrusion of the elements such as wind and rain. The size of the forward or outer wall 48 can be just slightly greater than the size of the vehicle body opening 32. In this manner, the edges of the forward wall 48 overlie the fixed frame member 34 on the vehicle body 22 as an aid in maintaining a good seal when the slideout unit is retracted. Seals (not shown) extending around the perimeter of opening 22 may be provided.

The room slideout unit 24 may be provided with windows in the forward and side walls, as shown, particularly when the vehicle is used as a recreational vehicle or house trailer.

Opening and closing movements of either the first or second slideout units or compartments 24 and 26 can be accomplished either manually or with a power assist, as will be described later. One of the slideout units can be powered and the other (say storage slideout unit 26) can be manually operated if desired. In certain embodiments (i.e., when manual operation is desired), handles 50 may be provided on the front wall of the slideout unit 24, so that the slideout unit can be opened and closed manually. A lock 52 for room slideout unit 24 may be provided. Such lock should be provided unless the drive mechanism employs a drive (e.g., a worm drive) that locks the slideout unit 24 in position when it is at rest (whether retracted, extended or in between). Similarly, the storage slideout unit 26 may be provided with a handle 54 for manual operation, and a lock 56.

Either one or more than one space-expanding slideout units 24 may be provided in a vehicle 20 in accordance with this invention. A horizontally reciprocable room slideout unit 24 may be provided in any of the exterior walls of vehicle 20, e.g., the left side wall 30 as shown, the right side wall, and/or the rear wall of vehicle 20. Two room slideout units 24, one on each side of the vehicle may be provided. Also in accordance with this invention, one may provide a vertically reciprocable slideout unit in order to expand interior space in a vertical direction. The drive mechanism in all cases may be as described in FIGS. 4, 5 and 13 through 14.

Figure 4:
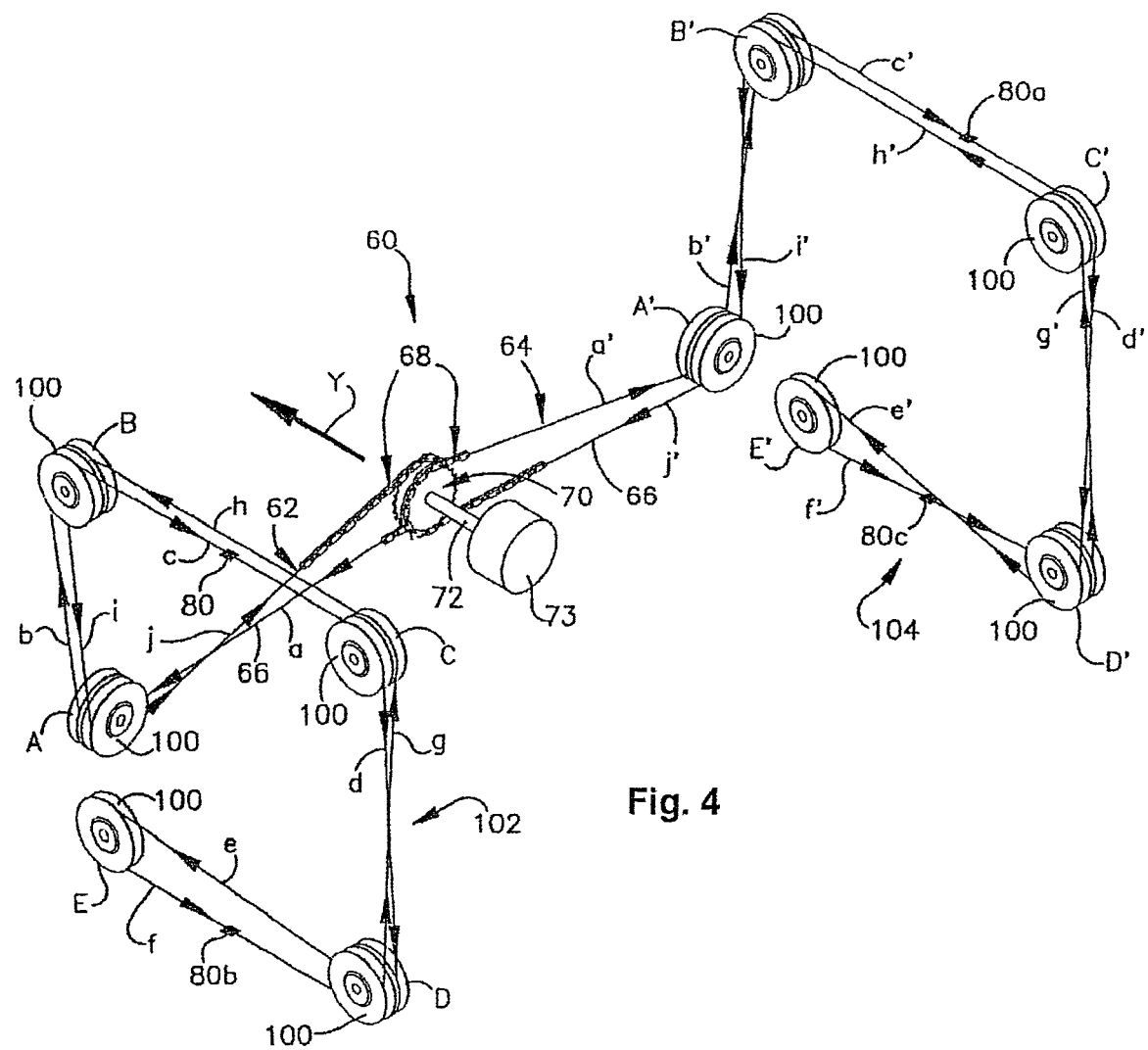
FIG. 4 is a diagrammatic perspective view of a drive mechanism for a slidable room assembly according to a first embodiment of this invention showing the drive mechanism in a first or slideout retracted position.
Figure 5:
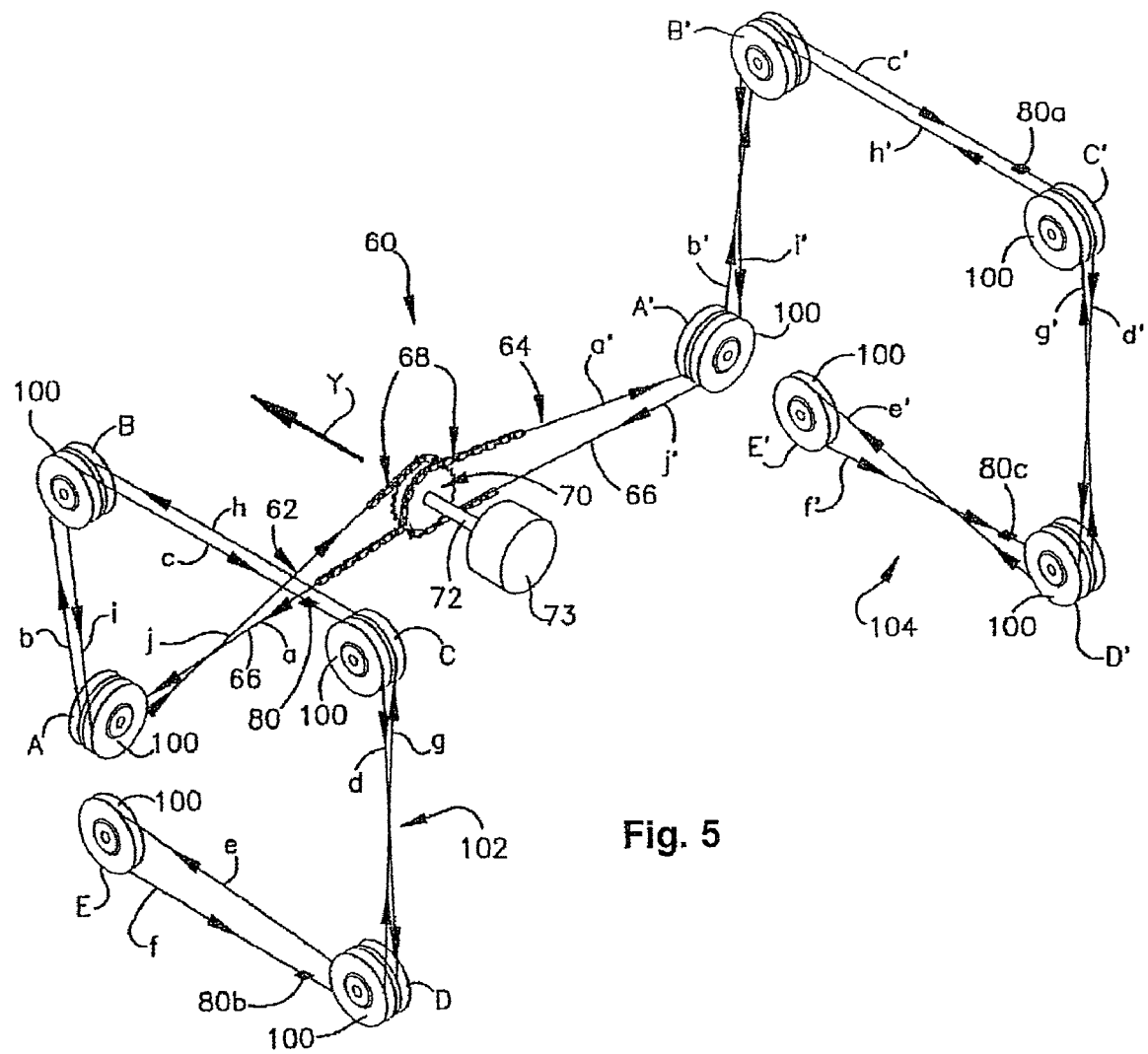
FIG. 5 is a diagrammatic perspective view of the drive mechanism shown in FIG. 4, showing the drive mechanism in a second or slideout extended position.

FIGS. 4 and 5 show various force transmission mechanisms (or drive mechanisms) in accordance with a first embodiment of this invention for transferring force or power from a power input source to a slideout unit. The power input source may be either manual or motorized, as will be illustrated hereinafter. In all embodiments, force is transmitted evenly to upper and lower portions and to both sides of the slideout unit, resulting in smooth, even application of force, so that the slideout unit reciprocates smoothly along its predetermined axis and in a predetermined plane, with no tendency to twist or bind, and with minimum power input required, considering the appreciable weight of a typical slideout unit for a vehicle.

The force transmission systems (or drive mechanisms) illustrated in the embodiments of FIGS. 4 through 10 are shown as on-board systems, which are mounted on the slideout unit 24 so that the drive mechanism in its entirety reciprocates with the slideout unit 24. By mounting the entire drive mechanism on the slideout unit 24, and not on fixed frame 34 or any other member that is part of the vehicle body 22, one can manufacture the slideout unit 24 and its drive mechanism as a modular unit and ship the modular unit to another site for assembly with or installation in a vehicle body 22 having a slideout opening 32 of the required size.

Referring now to FIG. 4, a drive mechanism, (or force transmission mechanism) 60 according to a first and preferred embodiment is shown displaced. This mechanism 60 comprises a pair of flexible, high modulus drive members, which can be endless cables 62, 64, as shown. Each of the cables 62, 64 comprises a substantial length of strong, flexible cable 66 joined at its ends to respective ends of a short length of chain 68 (e.g., 48 inches or 1.2 meters). The material forming cable 66 may be steel, nylon, or other strong, flexible high modulus material. The cable material can be 3/16 inch (4.8 mm) diameter steel. The short lengths of chain 68 of the cables 62, 64 engage respective axially spaced first and second sets of sprocket teeth of a double sprocket 70. The length of chain 68 must equal or exceed the sum of the amplitude of reciprocating movement of first slideout unit 24 and one-half the circumference of sprocket 70.

While cables are the preferred drive members (with or without a short length of chain 68 as illustrated in FIGS. 4 and 5), other flexible, high modulus drive members, such as v-belts, can also be used. A chain is less desirable than a cable for an entire drive member. The cables or other drive members should be taut at all times, and so a high modulus material should be used. A drive member material that has no tendency to creep is preferred; if the material does creep, periodic adjustment of tension will be required.

Figure 7:
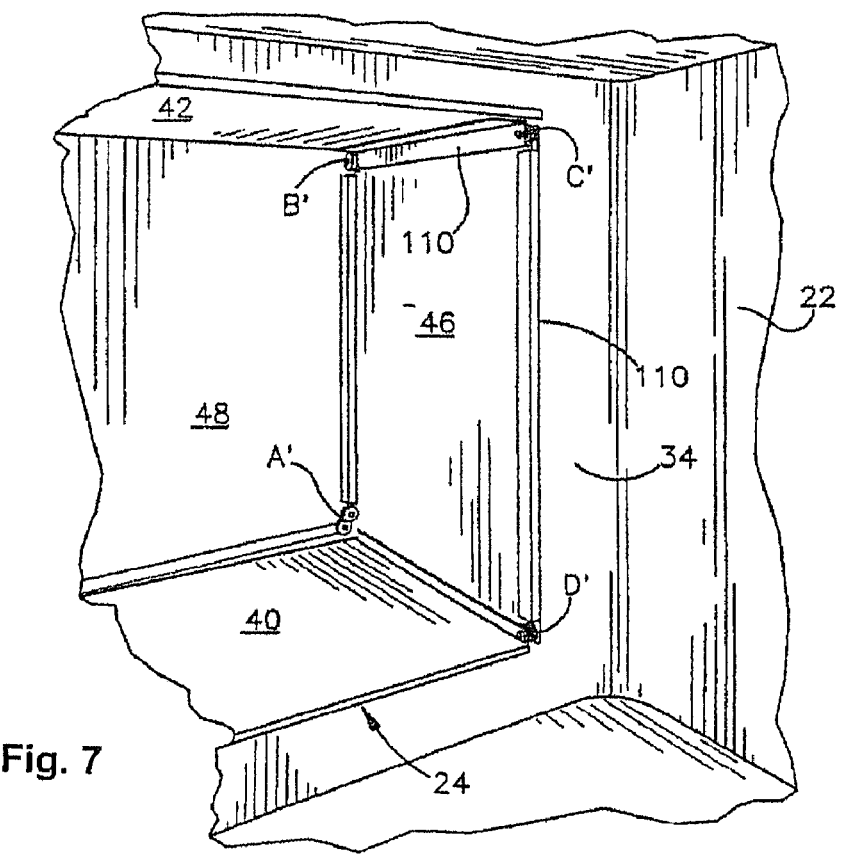
FIG. 7 is a perspective view of a portion of the interior of a slideout unit in accordance with this invention.
Figure 9:
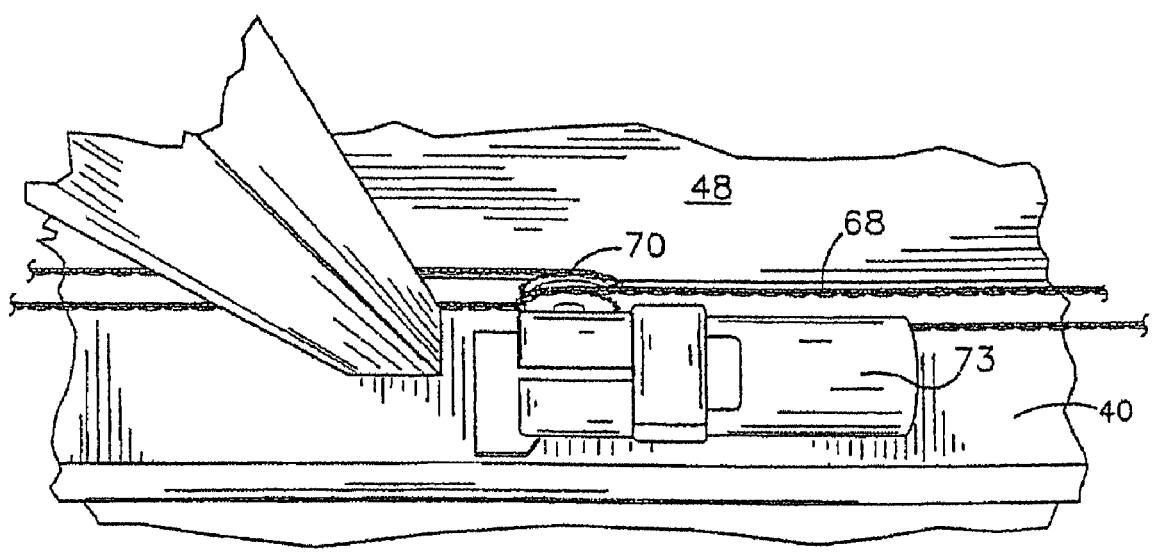
FIG. 9 is a top plan view looking down on a motor used in a first embodiment of the invention illustrated in FIGS. 4 and 5.
Figure 10:
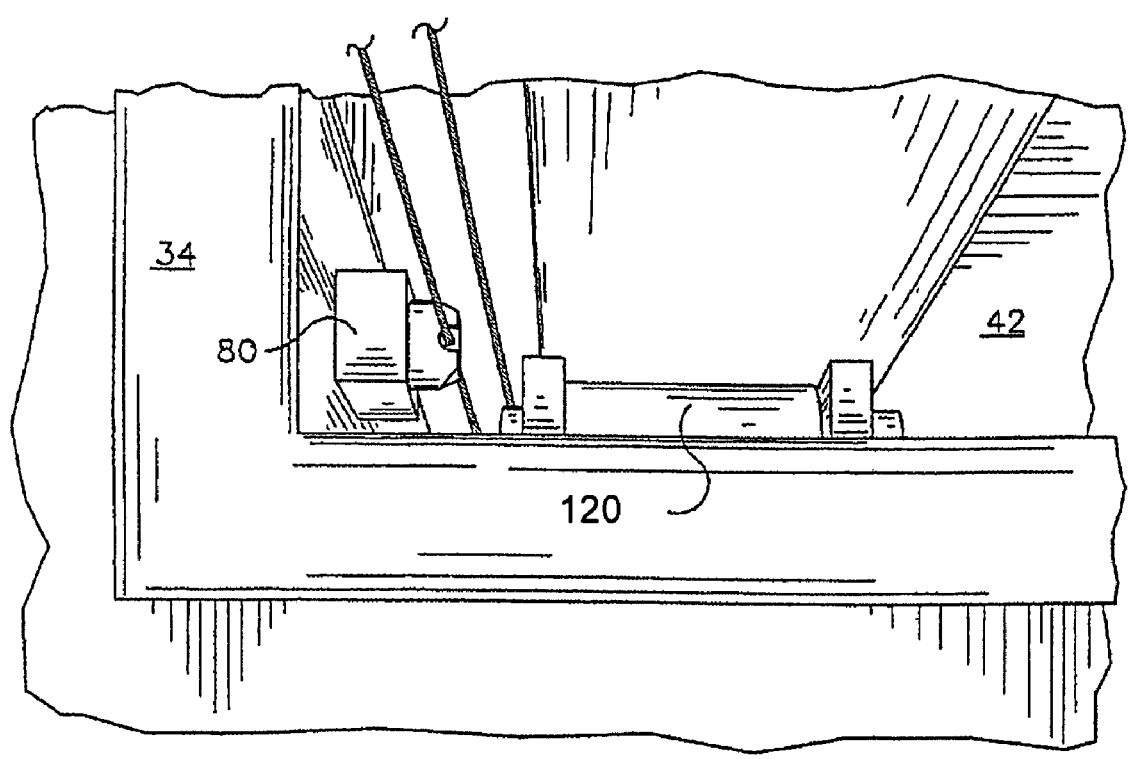
FIG. 10 is an elevational view of a portion of the interior of a slideable room assembly of this invention, looking up at the underside of a slideout unit and showing an anchor and a roller for positioning and supporting the slideout unit.

Sprocket 70 may be located in a lower portion of slideout unit 24, just above the floor 40 and just behind the forward or outside wall 48 of the slideout unit, as best seen in FIGS. 7 and 9. Sprocket 70 is mounted on a shaft 72 for rotation therewith, which may be a drive shaft. Shaft 72 extends along a center axis Y (see FIG. 4) of slideout unit 24, midway between side walls 44 and 46. Shaft 72 may be a drive shaft of an electric motor 73, which (when present)

may be mounted just above floor 40 of the slideout unit 24, close to outside wall 48. Alternatively, a portable motor (which is connected to drive shaft 72 only when the slideout unit 24 is to be moved), a hand crank (which may be connected to drive shaft 72), or manual power (applied through handles 50) may be used instead of electric motor 73. Whatever form of power input is used, it is advisable to lock the slideout unit in place when it is not in motion. A worm drive is one means (and a preferred means) for accomplishing this. The worm drive performs a locking function when the slideout unit 24 is at rest, locking the slideout unit 24 in place (in the closed position when fully retracted, for example), so that lock 52 is not necessary. With other drive mechanisms, locking means (e.g., a cam lock, or clamp in the walls of slideout unit 24) must be used to retain the slideout unit 24 in position.

A plurality of anchors 80 are provided for securing the cable drive members 62, 64 to fixed frame member 34 of vehicle body 22. Four anchors 80, 80*a*, 80*b*, and 80*c*, i.e., two anchors for each cable drive member 62, 64, are highly preferred. These anchors 80 are mounted on fixed frame 34 (see FIG. 8) and clamp the cable drive members 62, 64, at spaced points as shown in FIGS. 4 and 5. When, four anchors 80, 80*a*, 80*b* and 80*c* are used, two anchors 80 and 80*b* are disposed in vertically spaced relationship on one side of room slideout unit 24, and the other two anchors 80*a* and 80*c* are disposed in vertically spaced relationship on the other side of room slideout unit 24, as may be seen in FIGS. 4 through 6. Two anchors 80, 80*a* are disposed in an upper portion of room slideout unit, above the center of mass CM (see FIG. 6) and the other two anchors 80*b*, 80*c* are disposed in a lower portion of room slideout unit 24, below the center of mass CM.

Figure 6:
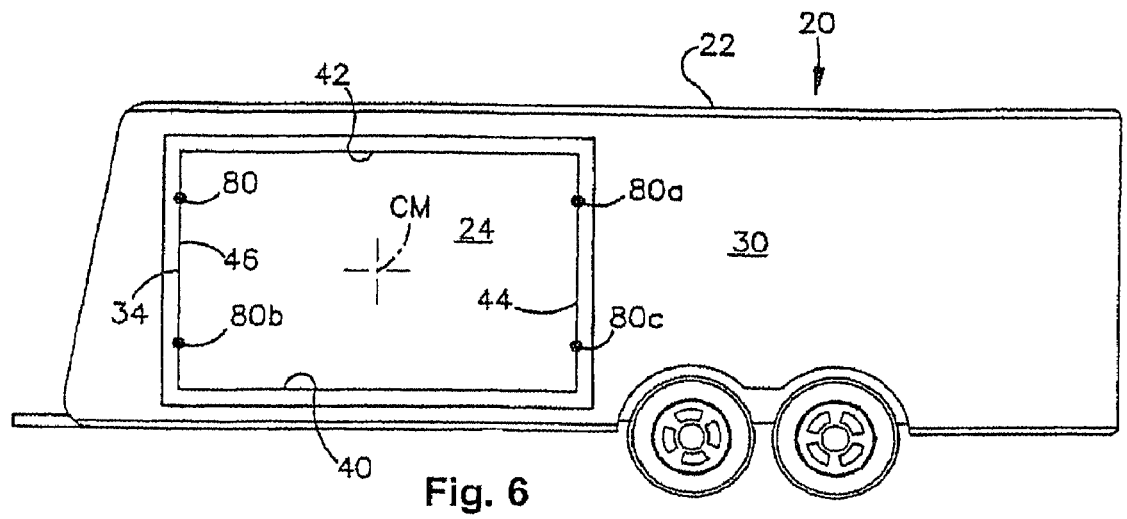
FIG. 6 is a schematic fragmentary side elevational view of a vehicle according to this invention, showing a room slideout unit and the positions of anchors that secure slideout unit cables to a fixed vehicle frame.

The reason why at least four anchors 80 are highly preferred may be seen with reference to FIG. 6. If one uses four anchors 80, 80*a*, 80*b* and 80*c* as shown in FIGS. 4 through 6, i.e., two anchors 80, 80*a* in an upper portion of slideout unit 24, above the center of mass CM thereof, and the other two anchors 80*b*, 80*c* in a lower portion of slideout unit 24, below the center of mass CM, force is applied evenly to the slideout unit 24 so that the slideout unit 24 slides smoothly in a predetermined path along its axis of reciprocation Y. This places minimal stress on the guide means (discussed subsequently) for guiding the slideout unit 24. The slideout unit 24 is pulled as it slides. This requires a sturdier guide system, one that will support as well as guide slideout unit 24, than is necessary when four anchors are used. More than four anchors can be used, but this requires a more complex drive mechanism without commensurate benefit. The benefits of this invention are best obtained with four anchors arranged as described above.

Any device that is capable of securing or clamping a cable 66 (or other flexible device member) to which body 22 (specifically to frame 34 thereof) can be used as an anchor.

Returning now to FIG. 4, drive mechanism 60 further comprises a series of sheaves 100. Sheaves 100 are idler wheels that serve as possible guides for guiding cables 62 and 64. Together with sprocket 70, sheaves 100 define the paths of cables 62 and 64.

Other types of guide members can be used when other types of drive members, e.g., v-belts or chains, are used instead of cables. The guide members may be an adjustable sheave, a sprocket or a pulley, for example; typically the guide member is a wheel of one sort or another. The type of drive member dictates the preferred form of guide member as is well known.

Sheaves 100 may be of conventional structure, each comprising a groove for receiving a cable portion 66 of cable 62 or 64. Sheaves 100 are arranged in two sets 102 and 104. A first set 102 disposed along a first or left (or rearward) side 44 of slideout unit 24, defines (together with sprocket 70) a path for the first cable 62. A second set 104, disposed along a second or right side 46 of slideout unit 24, defines (together with sprocket 70) a path for the second cable 64.

The first set 102 of sheaves 100 comprises four pairs A, B, C and D of sheaves, and a fifth sheave E, which is a single sheave. The sheaves 100 forming the first pair A have a common longitudinal axis (i.e., an axis that is parallel to the center axis Y and to the side walls 44 and 46 of the slideout unit 24). Each of the pairs B, C and D comprises two sheaves having a common transverse axis (i.e., an axis that is perpendicular to the center axis Y and parallel to the forward or outside wall 48 of the slideout unit). Sheave E also has a transverse axis. The sheaves 100 forming each pair A, B, C and D are freely rotatable on their respective shafts and freely rotatable with respect to each other. All sheaves 100 rotate only when slideout unit 24 is being moved and are stationary at other times. The two sheaves 100 of each pair rotate in opposite directions during movement of slideout unit 24, as will be hereinafter explained.

The first pair A of the first set 102 of sheaves 100 is located in a lower corner of the slideout unit 24, near the intersection of the slideout unit's floor 40, forward wall 48 and left side wall 44 (that is a rearward side wall relative to vehicle body 22 in the embodiment shown, wherein the slideout unit 24 is on the left side of the vehicle 20). The second pair B and third pair C of sheaves 100 are located near the slideout unit's ceiling 42, and near the forward and rearward ends, respectively, of the slideout unit 24. The fourth pair D of sheaves 100 and the fifth sheave E are preferably located below the floor 40 of the slideout unit 24, along the left side 44 of the unit 24 and near the rearward and forward ends, respectively, of the slideout unit. Similarly, sheaves A' through E' or the second set 104 are located in corresponding positions adjacent to the right side wall 46 of slideout unit 24. The positions of the sheaves 100 in both sets 102 and 104 are shown diagrammatically in FIG. 4, and the positions of the sheaves in the second set 104 may also be seen pictorially in FIG. 7.

The first set 102 of sheaves 100, together with sprocket 70, collectively define a path for the first cable 62. This path comprises a plurality of courses, a through j, each course being defined as a segment of the cable 62 between the sprocket 70 and the first sheave, and between each pair of successive sheaves in the drive train. Starting at the sprocket 70, a first outbound course a extends transversely from the sprocket 70 to one of the first pair A of sheaves 100. Successive outbound courses b, c, d, and e extend from the first pair A of sheaves 100 to the fifth and last sheave E, as shown in FIG. 4. Courses b through e are disposed alongside the left side 44 of the slideout unit 24. At the fifth and last wheel E, the first cable 62 reverses direction, and the return path comprises a plurality of courses f through i, from the fifth sheave E through the first pair A of sheaves, alongside the left side 44 of the slideout unit 24. Courses b through i (those disposed along the left side 44 of slideout unit 24) collectively form a first set of courses. Finally, a return course j extending from the first pair of sheaves 100 transversely back to the sprocket 70 completes the closed loop through which the first cable 62 moves.

Similarly, a second set 104 of sheaves 100, comprising a first pair A' of sheaves 100 having a longitudinal axis (at the lower right forward corner of the slideout unit 24) second through fourth pairs (B', C' and D') of sheaves 100, and a fifth sheave E', each having a transverse axis, and, together with the sprocket 70, define a path for the second cable 64. This path is a mirror image of the path for the first cable 62 and comprises courses a' through j'. Courses b' through i' are parallel and adjacent to the right side wall 46 of slideout unit 24 and form a second set of courses. Those courses a, a', j and j', which are parallel to the forward or outside wall 48 of slideout unit 24 (and are therefore perpendicular to side walls 44 and 46) form a third set of courses. All of the sheaves 100 in the second set 104 are located near the right hand (or forward) wall 46 of the slideout unit 24.

Figure 8:
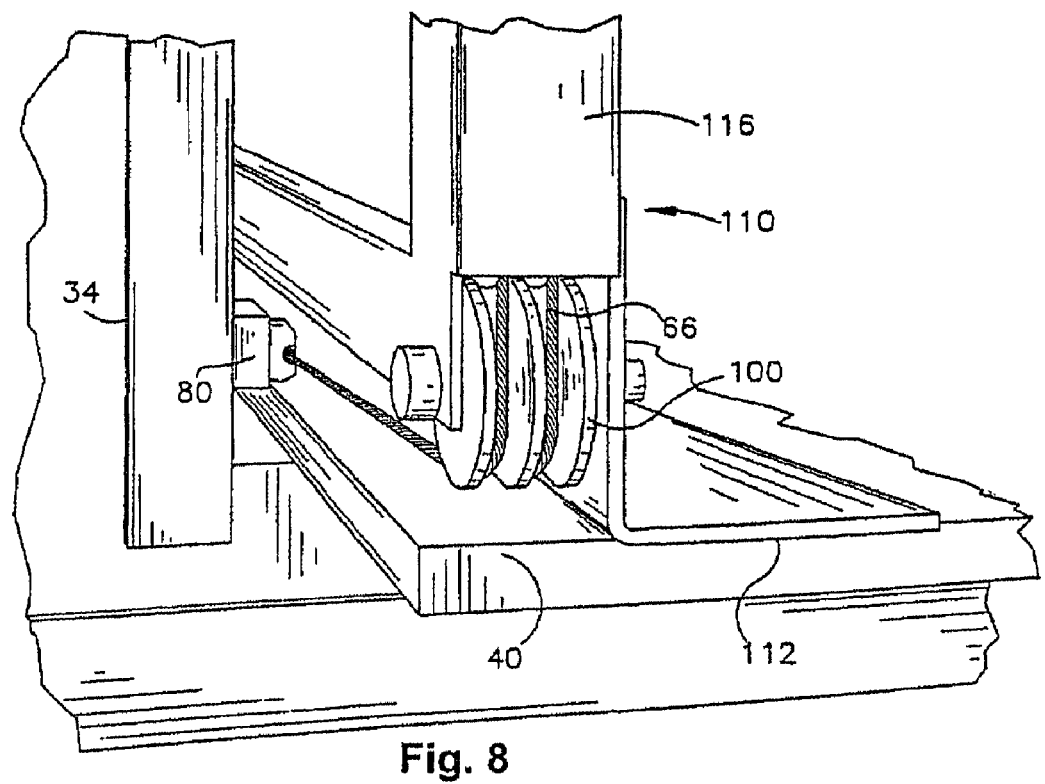
FIG. 8 is a perspective view of a portion of the apparatus of this invention, showing a cable attachment and anchor and a pair of sheaves on an enlarged scale.

Sheaves 100 may be rotatably mounted on shafts, which in turn are fixedly secured to a slideout unit frame 110, as shown in FIG. 8. The slideout unit frame 110 may include a pair of L-shaped frame members 112, which are affixed to the floor 40 of slideout unit 24 and which extend close to respective slideout unit side walls 44 and 46 from a forward end to a rearward end of the slideout unit 24, (i.e., longitudinally or parallel to axis of reciprocation Y), and a pair of longitudinally extending channels that are affixed to respective L-shaped frame members 112. As a result, the axes of all of the sheaves 100 will reciprocate with slideout unit 24, and the sheaves 100 themselves will both reciprocate and rotate (as a result of cables 62 and 64 passing over the sheaves 100) as the slideout unit 24 is reciprocated.

The slideout frame structure may further include hollow sheaths 116 of rectangular cross section. These hollow sheaths 116 provide guide tracks for vertical courses of cables 62 and 64.

Anchors 80 and 80b are mounted in vertically spaced relationship on fixed frame 34 of which body 22, adjacent on side wall 44 of slideout unit 24, and engage cable 62 along courses c and f, respectively. (As will be noted, c is an outbound course and f is a return course.) Similarly, anchors 80a and 80c are mounted in vertically spaced relationship on fixed frame 34, adjacent to the other side wall 46 of slideout unit 24, and grip cable 64 along courses c' and f, respectively.

Figure 11:
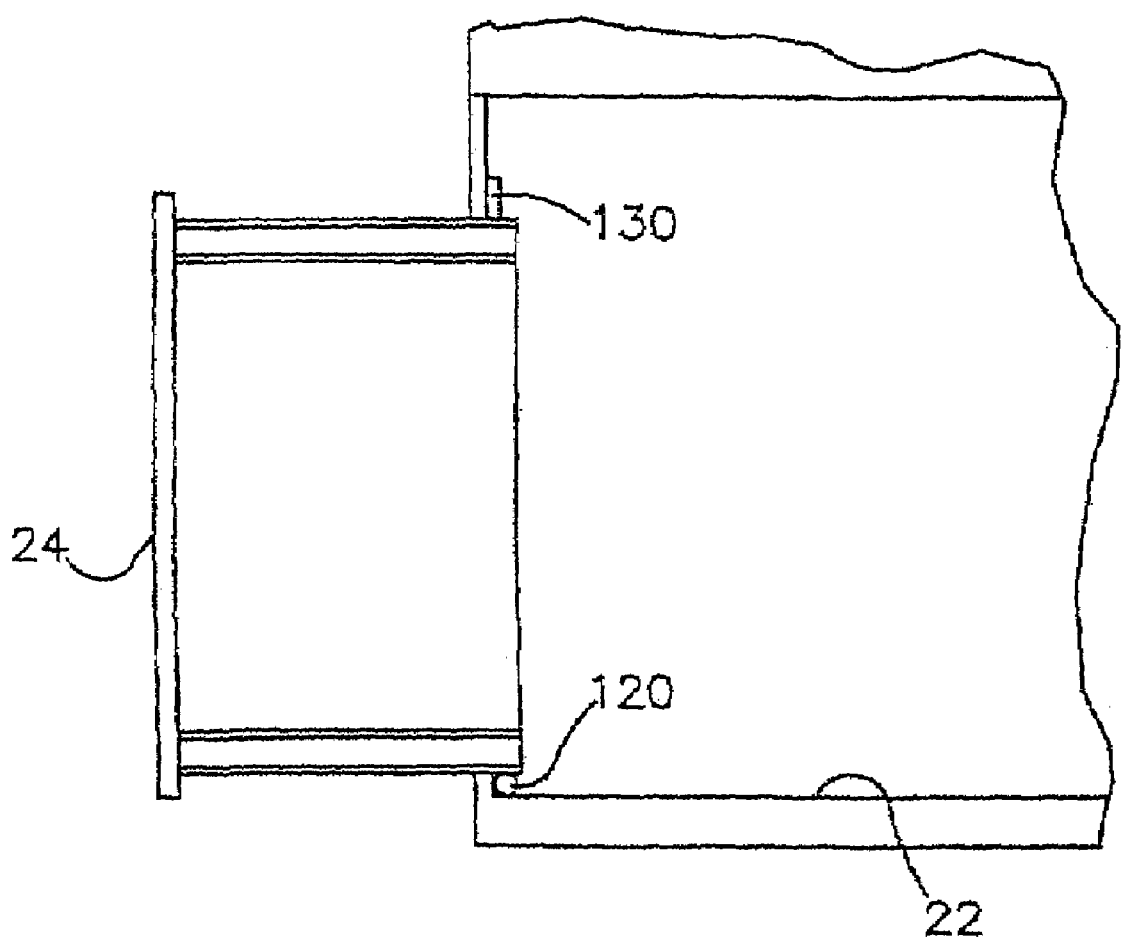
FIG. 11 is a diagrammatic side elevational view of a slideout unit according to this invention showing rollers for supporting the slideout unit and a limit stop for limiting outward movement of the slideout unit.

A plurality of roller assemblies 120 (see FIGS. 10 and 11) may be provided for smooth reciprocation of slideout unit 24 relative to vehicle body 22. These roller assemblies 120 may include a roller, which engages the underside of slideout unit floor 40, and which is rotatably mounted in a mounting bracket affixed to the floor of vehicle body 22. If desired, the mounting of roller assemblies 120 can be reversed, so that the roller assemblies 120 are rotatably mounted in mounting brackets on the underside of slideout unit floor 40 and engage the floor of which body 22 in rolling relationship. In either case, the roller assemblies may be located close to side edges of slideout unit floor 40.

The roller assemblies 120 furnish sufficient support for slideout unit 24 when four anchors 80, 80a, 80b and 80c are used.

A limit stop 130 (FIG. 11) may be provided to limit outward movement of the slideout unit 24.

Sliding movement of the slideout unit 24 may be guided by the cables 62, 64. Because these cables are taut and are formed of high modulus material, no additional guiding system is necessary in preferred embodiments employing four anchors. However, guide means, comprising for example slide blocks can be provided, although not required.

Operation of an apparatus according to a first embodiment of this invention will now be described with particular reference to FIGS. 1, 2, 4 and 5.

When a slideout unit 24 of a vehicle is in a first or retracted position, as shown in FIG. 1, drive mechanism 60 is in a first position, as shown in FIG. 4. The chain portion 68 of each cable 62 and 64 makes a one-half turn around sprocket 70, with most of the remaining length of the chain portion disposed on a return course j or j', with only a very small part of each chain 68 disposed along an outbound course a or a' of cable 62 or 64. Anchors 80 are disposed along respective courses c, c', f and f, at distances from respective sheave pairs C, C', D and D' that exceed the amplitude of reciprocatory movement of slideout unit 24.

When it is desired to move slideout unit 24 from the first or retracted position shown in FIG. 1 to the second or extended position shown in FIG. 2, motor 73 is started by means of a switch (not shown) and is caused to turn in one direction. Motor 73 drives double sprocket 70, which in turn drives cables 62 and 64 in the direction of the arrows in FIGS. 4 and 5. This causes sheaves 100 (which as previously noted are rotatably mounted on the slideout unit 24) to rotate. The cables 62, 64 also move relative to sheaves 100 in the direction of the arrows. Since certain courses (c, c', f and f) of the cables 62 and 64 are secured in fixed position relative to the vehicle body 22 by anchors 80, the entire slideout unit 24, including sheaves 100, moves axially along axis Y in the direction of the arrow as shown in FIGS. 4 and 5, until the slideout unit 24 reaches the outward or extended position shown in FIG. 2. When slideout unit 24 is in the extended position shown in FIG. 2, the state of drive mechanism 60 is as shown in FIG. 5. That is, most of the length of chain portion 68 of cables 62 and 64 either engages sprocket 70 (extending one-half turn therearound) or extends outwardly along outbound courses a and a' of respective cable 62 and 64, only a small length of chain remains along return courses j and j'. Meanwhile, anchors 80 are close to their respective sheave pair C, C', D and D'. Actually the anchors 80 have stood still while the sheaves 100 have moved outwardly along axis Y.

To return the slideout unit 24 to the retracted position shown in FIG. 1, and the drive mechanism 60 to the state shown in FIG. 4, motor 73 is caused to turn in the opposite direction, and the cables 62, 64 move in the direction opposite that shown by the arrows.

The arrangement of sheaves can be inverted from top to bottom, or reversed from forward end 48 to rearward end of the slideout unit 24, or both, if desired.

When sheaves are inverted from top to bottom, sheave pairs A and A' are mounted near the ceiling 42 of slideout unit 24, so that the third set of courses of the cable (the courses that cross over from one side of the slideout unit to the other, e.g., from left side 44 to right 46 or vice versa), are near the ceiling of the slideout unit. Similarly, sheave pairs D and D' and sheaves E and E' would also be disposed near the ceiling 42. Sheaves pairs B, B', C and C' would be rotatably mounted near the floor 40 of slideout unit 24. This variation may be particularly desirable when the drive mechanism of this invention is used to reciprocate a storage slideout unit 26 or similar structure.

When the location of all sheave pairs or subsets is reversed from forward to rearward portion of the slideout unit 24, sheave pair A and A' are disposed near a rearward end of the slideout unit, and sheave pairs B and B' and sheaves E and E' are similarly disposed toward a rearward end. Sheave pairs C and C', and D and D' would then be located near a forward end of the slideout unit.

It is highly desirable both to invert and reverse the positions of sheaves 100, as described immediately above, when a drive mechanism according to this invention is used to effect sliding movement of a storage slideout unit 26.

Instead of continuous or endless cable drive members as shown, one can use "straight" cables or other drive members, i.e., drive members that have ends. Referring now to FIGS. 4 and 5, cable 62 can terminate at anchors 80 and 80b, eliminating courses d and c. Similarly, cable 64 can terminate at anchors 80a and 80c. The anchors then become end anchors, which may be of one of the structures shown or of other structures. Suitable structures are known in the art. Four points of attachment (at 80, 80a, 80b and 80c) are essential in this modification.

The drive mechanism is shown as being mounted on the slideout unit in each of the embodiments illustrated. However, if desired, this mechanism, including the sprocket 70 (where applicable) and the sheaves 100 (in all embodiments) may be mounted on fixed frame members that form part of the vehicle body 22 (or first module). In that case, the anchors 80 would be mounted on frame members associated with the slideout unit 24 (or second module).

Figure 12:
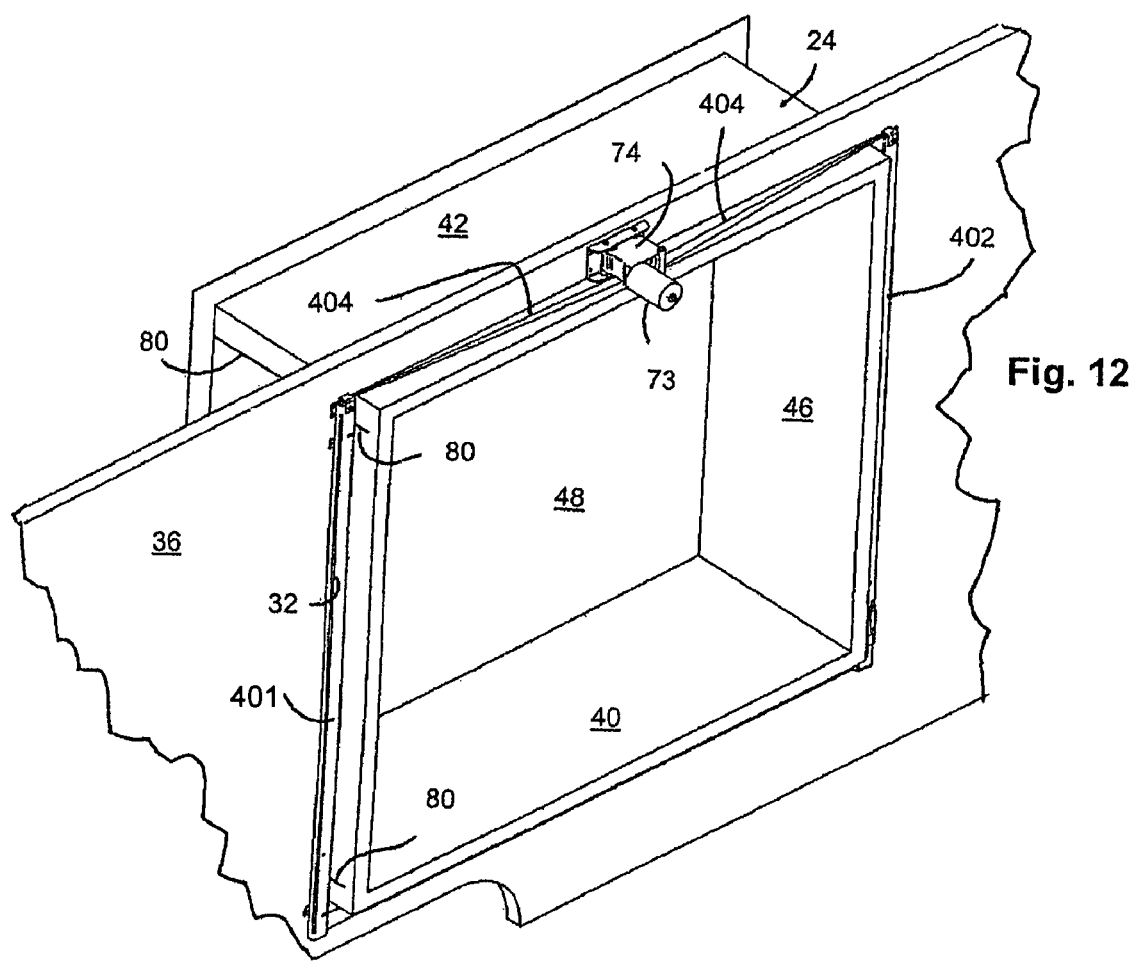
FIG. 12 is a perspective view of a portion of the interior of a slideout unit according to another embodiment of this invention.
Figure 13:
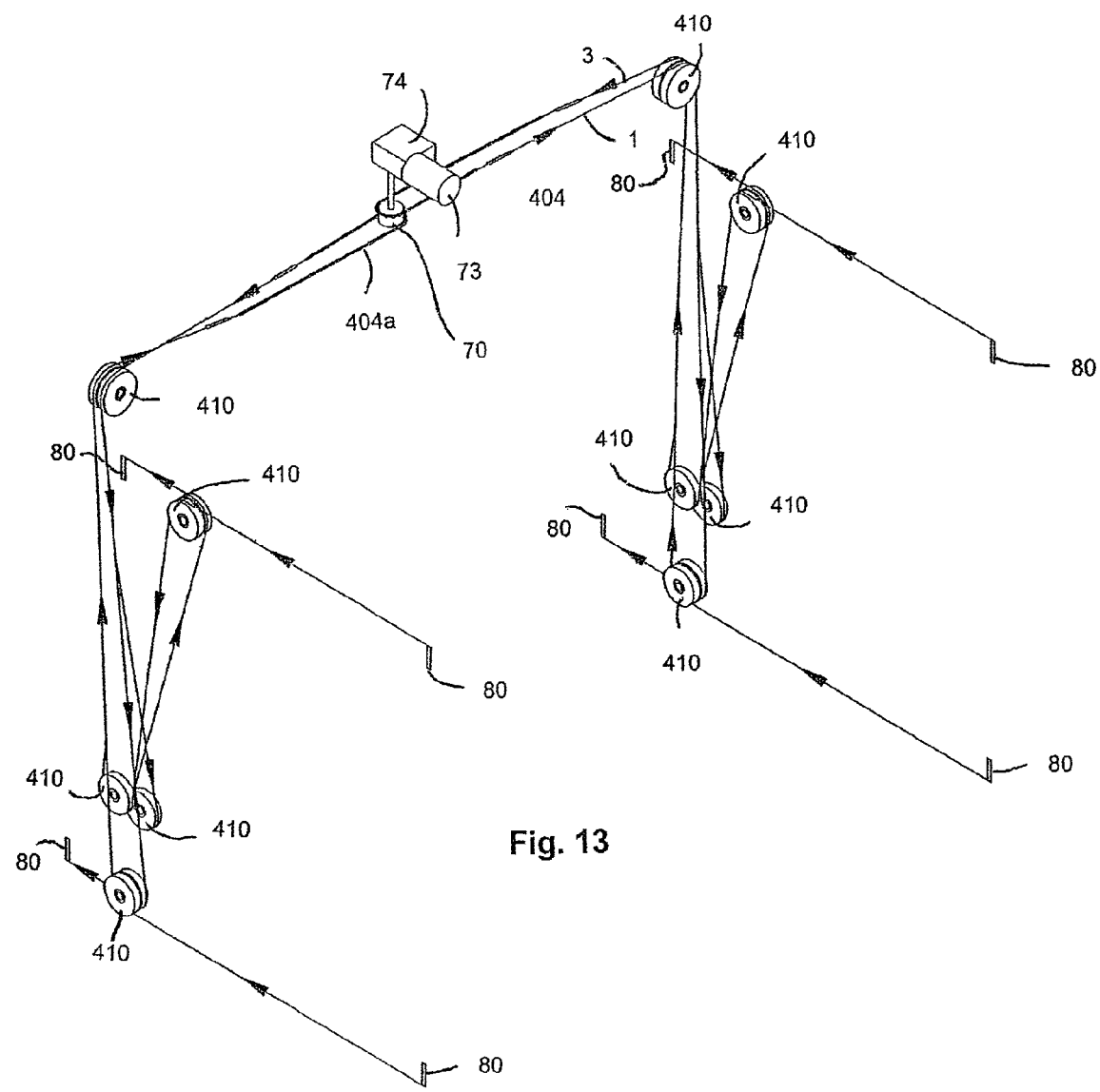
FIG. 13 is a diagrammatic perspective view of a drive mechanism for a slidable room assembly according to the embodiment shown in FIG. 12, showing the drive mechanism in a first or retracted position.
Figure 13A:
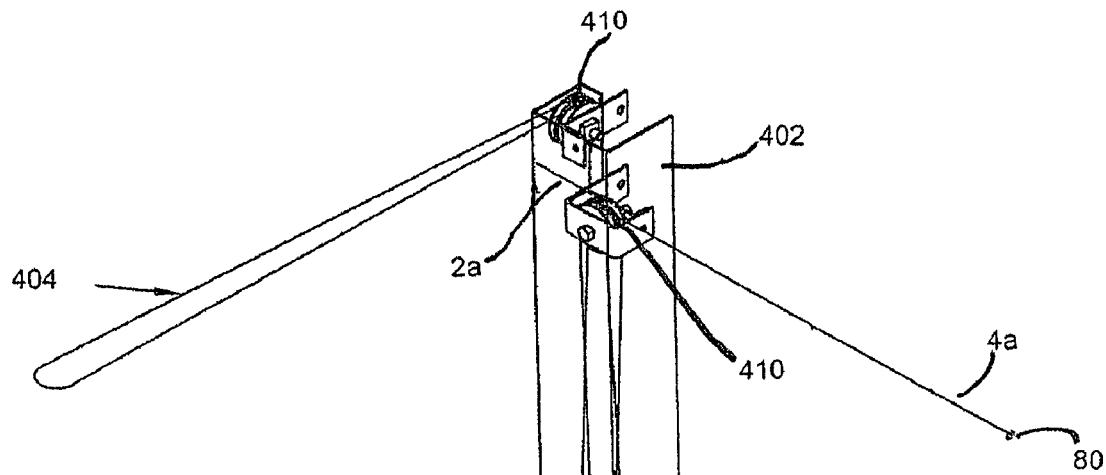
FIG. 13A is a perspective view showing details of a vertical jamb enclosing the drive cables according to the embodiment shown in FIG. 12.
Figure 13A:
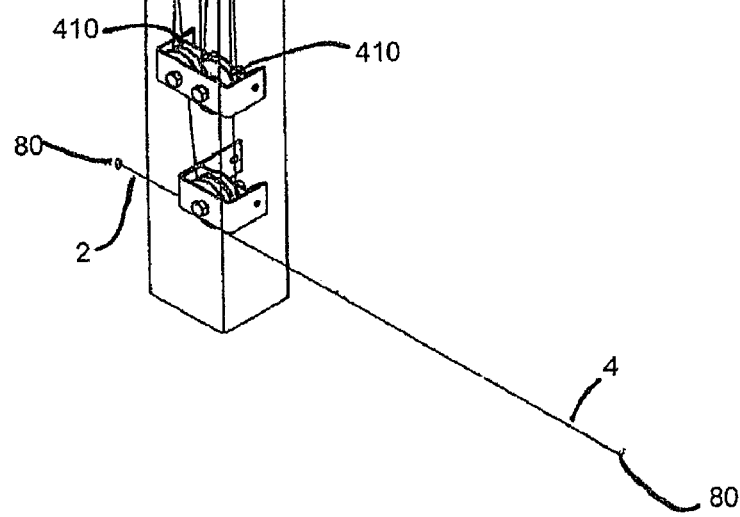
Figure 14:
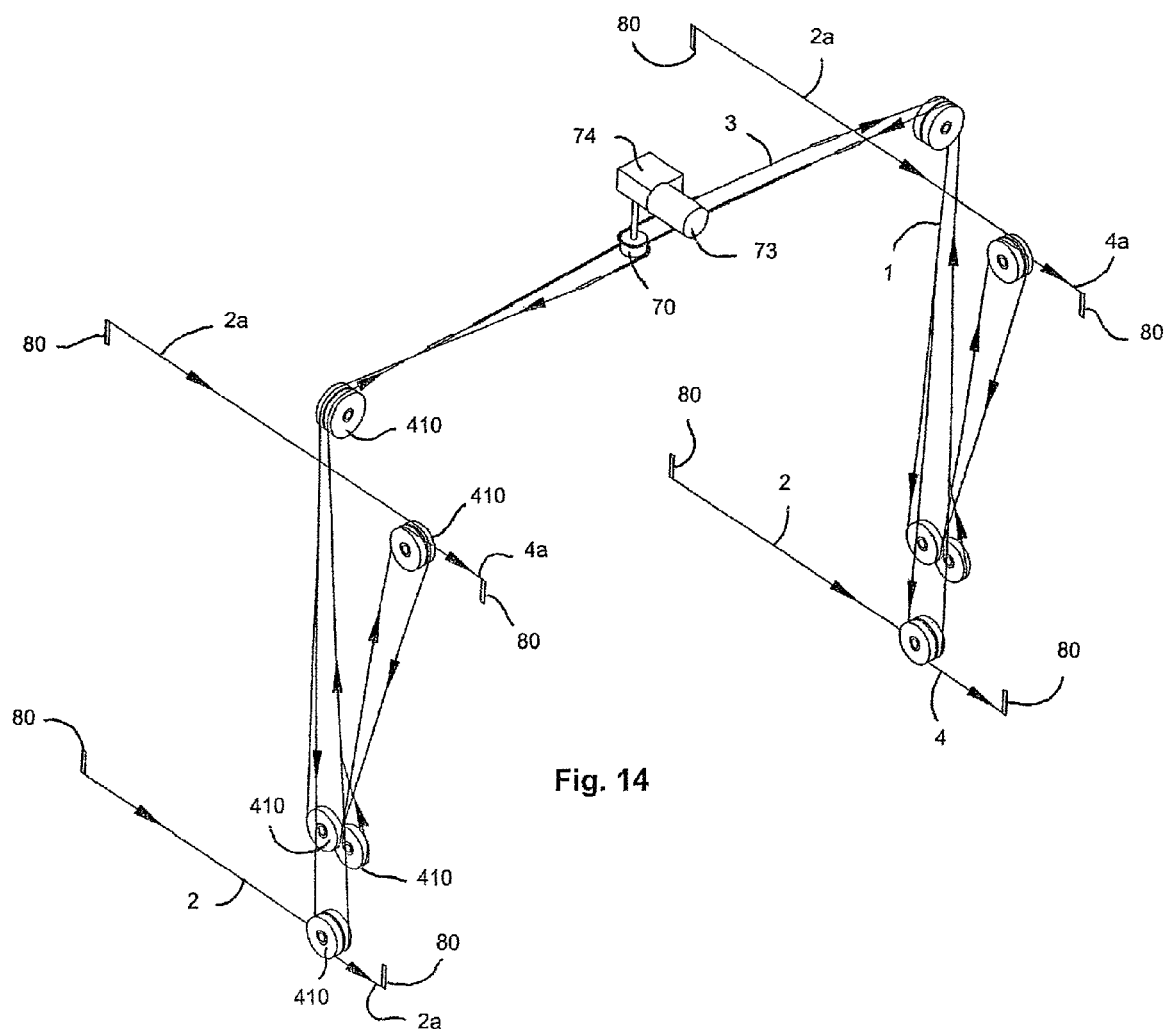
FIG. 14 is a diagrammatic perspective view of a drive mechanism for a slidable room assembly according to the embodiment shown in FIG. 12, showing the drive mechanism in a second or extended position.

FIGS. 12 through 14 illustrate an alternate embodiment of the present invention. In this embodiment, the drive mechanism (70, 73, 74) and the rotatable sheaves 410 are mounted to vehicle body 22 and the anchors 80 are attached to the slideout unit 24. As shown in FIG. 13A, the drive cables 404 and sheaves 410 can be enclosed in jambs 401, 402 on either side of the opening 32 in the vehicle body 22. Drive cable 404 enters the top of jamb 402, is directed downward by upper double sheave 410. Drive cable 404 has the shape of a double Y whereby the cable has four end sections 2, 2a, 4, 4a. The remaining sheaves direct the four end sections to the outside upper corner of the slideout unit 24 (end section 2a), the upper inside corner of the slideout unit 24 (end section 4a), the lower outside corner of the slideout unit 24 (end section 2) and the lower inside corner of the slideout unit 24 (end section 4). Preferably, three sets of sheaves 410 are double sheaves and the middle set of sheaves 410 are single sheaves to provide clearance for cable separation.

Figure 15:
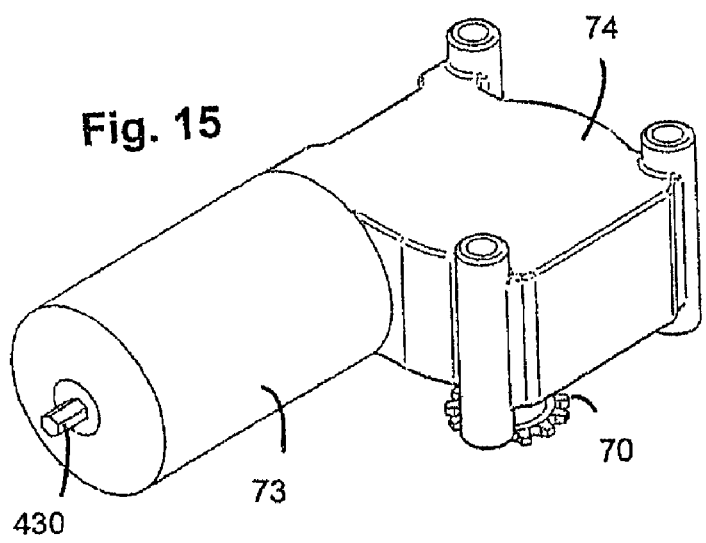
FIG. 15 is a perspective view of a motor for use with the present invention.

The drive mechanism consists of an electric motor 73 connected to a double sprocket 70 by a worm gear 74. In addition to changing the axis of rotation, the worm gear 74 also acts as a locking device to hold the slideout 24 in either the extended position (shown in FIG. 14) or the retracted position (shown in FIG. 13). If a worm gear is not used, it is preferable to provide another mechanism for locking the slideout unit 24 in either the extended or retracted positions. FIG. 15 shows a preferred embodiment for motor 73. The motor has been adapted to be manually driven. A hex shaped adapter 430 has been connected to the motor to permit manual rotation of the motor by a socket wrench. This permits the slideout 24 to be extended or retracted manually in the event power is not available for the motor.

In an alternate embodiment (not shown), the motor 73 is not provided and the slideout unit is only manually driven. This would be used where the slideout unit 24 is a storage unit 26. For such manually driven units, an adapter or handle could be provided on sprocket 70 to permit manual rotation of sprocket 70 to reciprocate the storage unit 26 or the storage unit could be manually moved by means of handles 50, 54.

Figure 13B:
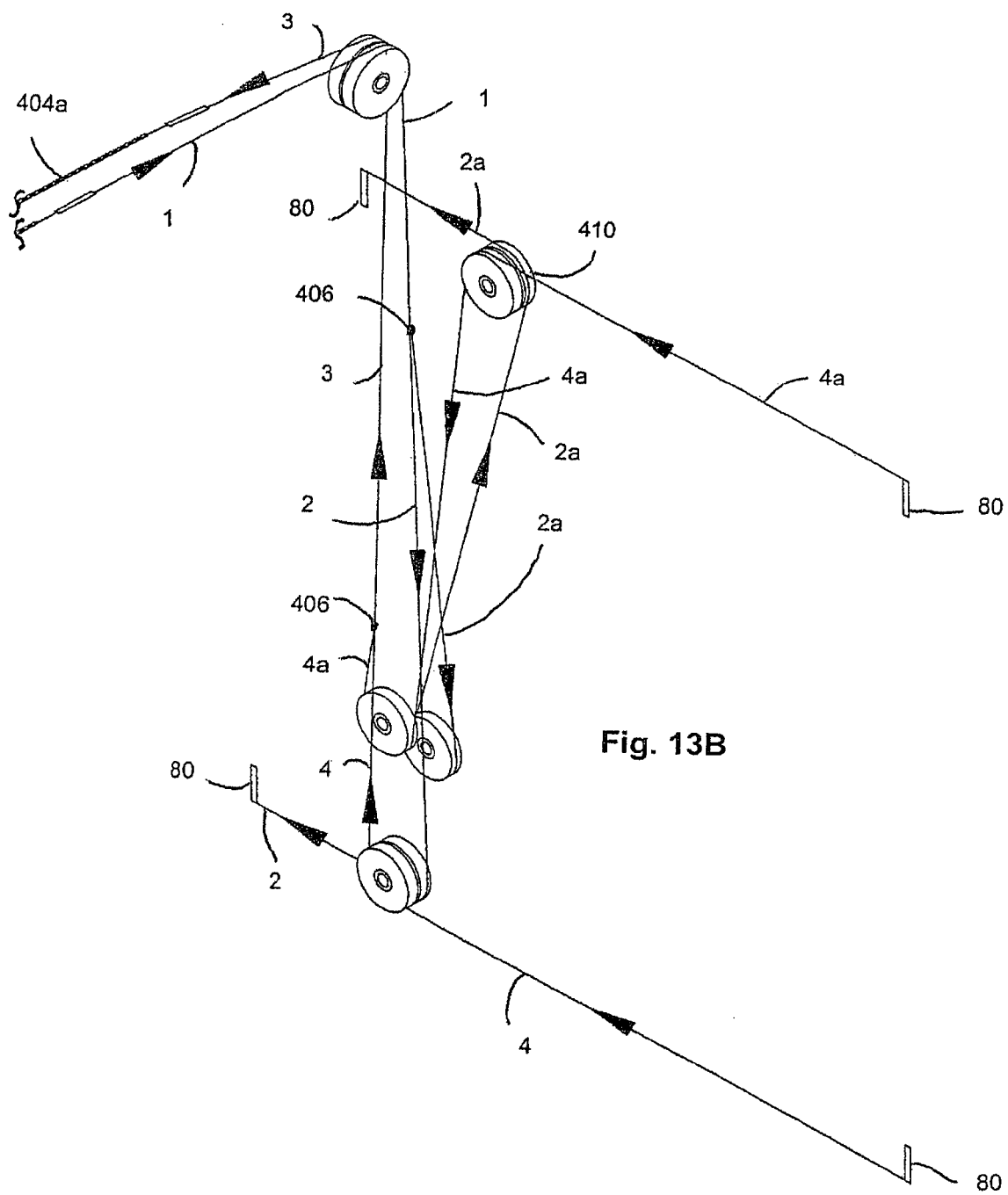
FIG. 13B is an enlarged perspective view showing the right side of the drive mechanism shown in FIG. 13.
Figure 13C:
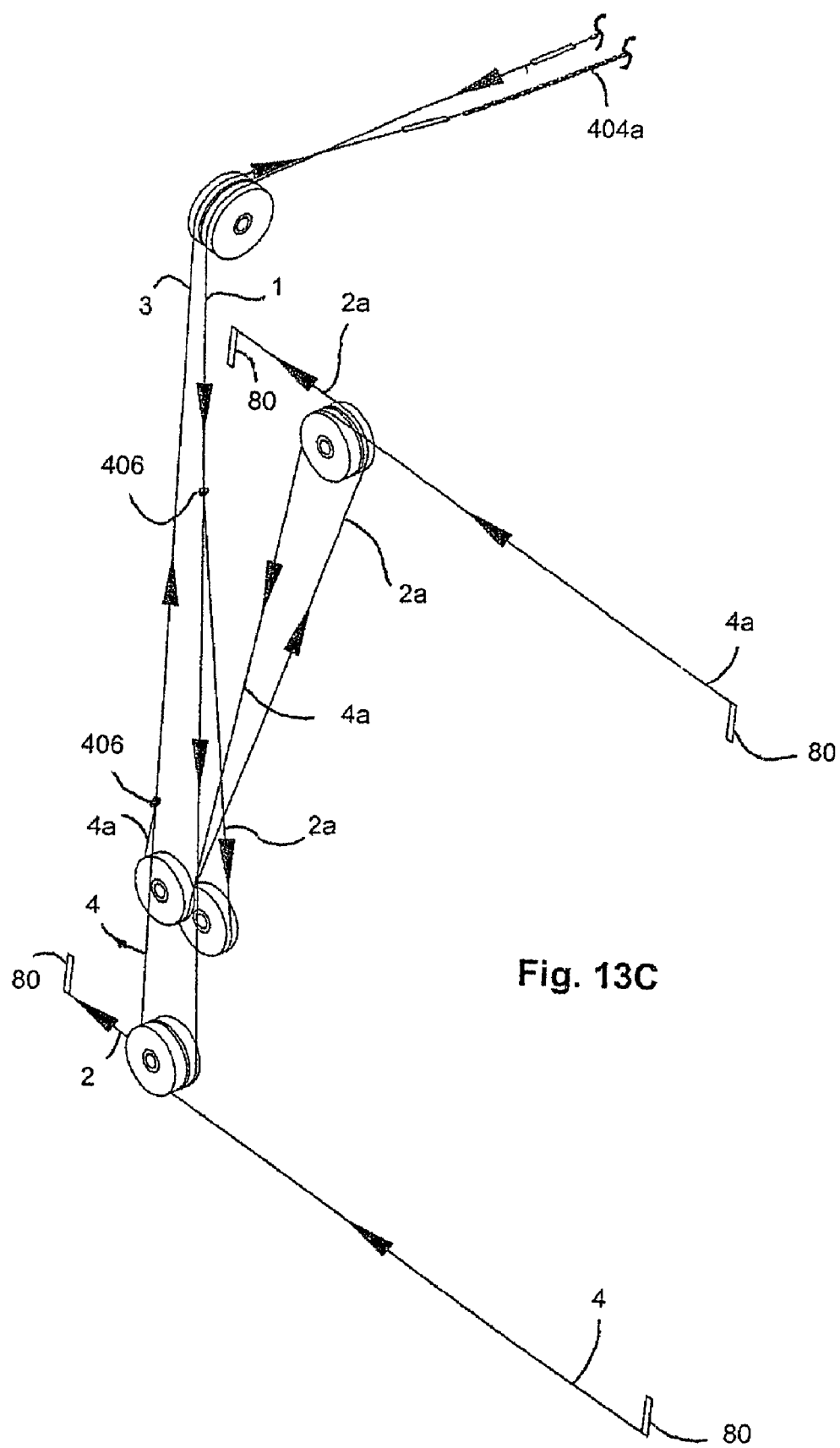
FIG. 13C is an enlarged perspective view showing the left side of the drive mechanism shown in FIG. 13.

FIGS. 13B and 13C illustrate the right and left sides of the drive mechanism shown in FIG. 13. Drive cable 404 includes a central section that has a chain or other sprocket engaging section 404a. Preferably, drive cables 404 non-slippingly engage sprocket 70 to keep the two drive cables 404 synchronized. Without this synchronization, it would be possible for one side of slideout 24 to move faster or further than the other side. This could result in the slideout 24 becoming cocked or canted in the opening 32 and possibly becoming jammed in place. The main section of the drive cable 404 consists of the chain 404a and two drive sections 1, 3. Each drive section 1 ultimately connects, via end sections 2, 2a, to the outside corners of the slideout unit 24 and each drive section 3 ultimately connects, via end sections 4, 4a, to the inside corners of the slideout unit 24.

Directional arrows shown in FIGS. 13, 13B, 13C and 14 show the direction of movement of the cables 404 for extending the slideout unit 24 (FIGS. 13, 13B, 13C) or retracting the slideout unit 24 (FIG. 14). Pulling on drive section 3 (shown in FIG. 13) pulls on end sections 4, 4a, which, being attached proximate the inside corners of slideout unit 24, pull the slideout unit from the retracted position to the extended position. Pulling on drive section 1 (shown in FIG. 14) pulls on end section 2, 2a, which, being attached proximate the outside corners of slideout unit 24, pull the slideout unit from the extended position to the retracted position.

The connection point is positioned so that connection 406 will not pass over any of the sheaves 410 as the slideout unit 24 is moved between the two positions. Drive section 3 extends into end section 4, which is connected to the lower inside corner of the slideout unit 24. End section 4a, connected to the upper inside corner of the slideout unit 24, is attached to drive section 3 by connector 406 at a point between the upper double sheaves 410 and the two single middle sheaves 410. Thus, drive cable 404 has the shape of a two "Y" shaped ends connected by a central portion. Although drive sections 1, 3 of drive cable 404 are shown as extending to corners of slideout unit 24, drive cable 404 could be formed by connecting two end sections 2, 2a to drive section 1 (and two end sections 4, 4a) to drive section 3.

The present invention affords a simple and reliable drive mechanism for a vehicle slideout unit. This drive mechanism is simpler and more reliable than vehicle slide-out drive systems that are presently known. The drive mechanism of the present invention assures that the slideout unit will advance and retract smoothly and evenly, whether power is applied manually or with a motor. Because of the simplicity of the present drive mechanism, there is less that can go wrong than is the case with presently known vehicle slideout operating systems.

These and other advantages are obtained in assemblies according to this invention.

While the present invention has been described with particular reference to a vehicle, it will be seen that this invention is also applicable to other structures. Such structures may comprise a base unit (or first module) and a slidable unit (or second module) that is reciprocable in an opening in a wall of the base unit between first and second positions relative to the base unit. For example, this invention may be applied to a cabinet: having a wall with one or more openings and comprising one or more drawers, each of that is slidably mounted in such opening and is moveable in a reciprocating manner between a closed position and an open position. In general, this invention is particularly useful for the movement of reciprocating members having substantial weight, as for example a slideout unit of an automotive vehicle.

While this invention has been described in detail with respect to specific embodiments thereof, it shall be understood that such description is by way of illustration and not by way of limitation.

Various modifications can be made without departing from the scope and spirit of this invention.

What is claimed is:

1. A slidable room comprising:
    two jambs, adapted to be attached to a vehicle about an opening in the vehicle, each jamb having: a plurality of pulleys thereon; and a drive cable therein, the drive cable comprising a central section, an interconnecting section extending from each end of the central section; and a plurality of room engaging sections extending from a free end of each interconnecting section, a free end of each room engaging section extending around at least one pulley and through the jamb, the central section and at least a portion of the interconnecting sections extending beyond an end of the jamb;
    a room, the room being adapted to be inserted into the vehicle opening and between the jambs, the free end of the drive cable room engaging sections being attached to the room; and
    a motor, the central section of the drive cable being operatively attached to the motor.

2. The slidable room according to claim 1, wherein the drive cable central section comprises a chain, the chain being attached to a sprocket on the motor.

3. The slidable room according to claim 1, wherein at least four drive cable room engaging section free ends are connected to a left side of the room and at least four drive cable room engaging section free ends are connected to a right side of the room.

4. The slidable room according to claim 1, further comprising an attachment anchor attached to each drive cable room engaging section free end.

5. The slidable room according to claim 1, wherein the plurality of pulleys comprises a plurality of spaced apart double pulleys.

6. The slidable room according to claim 1, wherein each drive cable interconnecting section extends around at least one pulley.

7. The slidable room according to claim 1, wherein one drive cable room engaging section is longer than another drive cable room engaging section attached to the same drive cable interconnecting section.

8. A slidable room comprising:
    two jambs, adapted to be attached to a vehicle about an opening in the vehicle, each jamb having: a plurality of pulleys thereon; and a plurality of cables therein, drive ends of the cables extending beyond an end of the jamb, room ends of the cables extending through the jamb;
    a room, the room being adapted to be inserted into the vehicle opening and between the jambs, the room ends of the cables being attached to the room; and
    a motor, the drive ends of the cables being operatively attached to the motor.

9. The slidable room according to claim 8, wherein the drive ends of the cables are connected to one another.

10. The slidable room according to claim 9, wherein the connection of the drive ends of the cables to one another includes at least a section of chain.

11. The slidable room according to claim 8, wherein each cable has one drive end and two room ends.

12. A vehicle comprising:
    at least one wall having an opening therein;
    two jambs, each jamb having: a plurality of pulleys thereon; and a drive cable therein, the drive cable comprising a central section, an interconnecting section extending from each end of the central section; and a plurality of room engaging sections extending from a free end of each interconnecting section, a free end of each room engaging section extending around at least one pulley and through the jamb, the central section and at least a portion of the interconnecting sections extending beyond an end of the jamb, the jambs being attached about the opening of the at least one wall;
    a room inserted into the opening of the at least one wall and between the jambs, the room being reciprocable between an extended position and a retracted position, the free ends of the drive cable room engaging sections being attached to the room; and
    a motor attached to the at least one wall, the drive cable central sections being operatively attached to the motor.

13. The vehicle according to claim 12, wherein two drive cable room engaging section free ends associated with one jamb are vertically spaced from two other drive cable room engaging section free ends associated with the one jamb; and
    two drive cable room engaging section free ends associated with the one jamb are attached to an outer portion of the room; and two other drive cable room engaging section free ends associated with the one jamb are attached to an inner portion of the room.

14. The vehicle according to claim 12, wherein four drive cable room engaging section free ends are connected to a left side of the room and four drive cable room engaging sections free ends are connected to a right side of the room.

15. The vehicle according to claim 12, wherein each jamb is attached adjacent a vertical edge of the opening.

16. The vehicle according to claim 12, wherein one drive cable room engaging section is longer than the other drive cable room engaging section attached to the same interconnecting section.

17. A method of reciprocating a slidable room mounted in a vehicle between a retracted position and an extended position, a plurality of flexible drive members being fixedly attached to sides of the slidable room, the method comprising:
    pulling on a first set of the flexible drive members while simultaneously reversing a second set of the flexible drive members to move the slidable room from the retracted position to the extended position; and
    pulling on the second set of the flexible drive members while simultaneously reversing the first set of the flexible drive members to move the slidable room from the extended position to the retracted position.

18. The method according to claim 17, wherein the step of pulling on a first set of the flexible drive members comprises pulling on shorter cables of the first set of the flexible drive members and simultaneously pulling on longer cables of the first set of the flexible drive members.

19. The method according to claim 18, wherein the step of pulling on the second set of the flexible drive members comprises pulling on shorter cables of the second set of the flexible drive members and simultaneously pulling on longer cables of the second set of the flexible drive members.

20. The method according to claim 18, wherein each set of the flexible drive members comprises at least two pair of the flexible drive members, and a reciprocating driver is connected to the first pair of the flexible drive members and the second pair of the flexible drive members,
    the step of pulling on a first set of the flexible drive members comprises reciprocating the reciprocating driver from a first position to a second position, and
    the step of pulling on a second set of the flexible drive members comprises reciprocating the reciprocating driver from the second position to the first position.

21. The method according to claim 20, wherein the reciprocating driver comprises a motor and the steps of reciprocating the reciprocating driver from a first position to a second position and reciprocating the reciprocating driver from the second position to the first position comprise rotating the motor.

22. The method according to claim 17, further comprising:
when the slidable room is in the extended position, locking the slidable room to prevent movement of the slidable room; and
when the slidable room is in the retracted position, locking the slidable room to prevent movement of the slidable room.

23. A method of reciprocating a slidable room mounted in a vehicle between a retracted position and an extended position, a plurality of pairs of flexible members being attached to the slidable room, each pair of flexible members comprising a short flexible member and a long flexible member, the method comprising:
pulling on two first pairs of flexible members while simultaneously reversing two second pairs of flexible members to move the slidable room from the retracted position to the extended position; and
pulling on the two second pairs of flexible members while simultaneously reversing the two first pairs of flexible members to move the slidable room from the retracted position to the extended position.

24. A vehicle comprising:
at least one wall having an opening therein;
a room inserted into the opening of the at least one wall, the room being reciprocable between an extended position and a retracted position;
two sets of flexible drive members attached to the room, wherein each set comprises two pairs of the flexible drive members;
a plurality of anchors fixedly securing each set of the flexible drive members to the room;
a driver operatively connected to each pair of the flexible driver members, the driver reciprocating the two sets of flexible drive members moving the room between the extended position and the retracted position; and
a lock preventing movement of the room when the room is stationary.

25. The vehicle according to claim 24, wherein the driver comprises a motor, the motor including the lock.

26. A vehicle comprising:
at least one wall having an opening therein;
a room inserted into the opening of the at least one wall, the room being reciprocable between an extended position and a retracted position;
two sets of flexible drive members, one set being associated with a first side of the room, the other set being associated with an opposite side of the room, wherein each set comprises two pairs of the flexible drive members operatively connected to a driver;
a plurality of anchors fixedly securing the flexible drive members to the room, the plurality of anchors comprising vertically spaced apart anchors fixedly securing each set of flexible drive members to the room.

27. The vehicle according to claim 26, wherein the plurality of anchors further comprises horizontally spaced apart anchors fixedly securing each set of flexible drive members to the room.

28. The vehicle according to claim 26, wherein the plurality of anchors are attached: to upper portions of inside portions of two sides of the room; to upper portions of outside portions of the two sides of the room; to lower portions of the inside portions of the two sides of the room; and to lower portions of the outside portions of the two sides of the room.

29. A vehicle comprising:
at least one wall having an opening therein;
a room inserted into the opening of the at least one wall, the room being reciprocable between an extended position and a retracted position, the room having a first side and a second side parallel to and offset from the first side; and
two sets of flexible drive members, one set being associated with the first side of the room, the other set being associated with the second side of the room, each set of flexible drive members comprising:
two pairs of flexible drive members, two flexible drive members extending in a first direction along a side of the room, two flexible drive members extending along the side of the room in a second direction opposite the first direction, wherein each pair of flexible drive members is operatively connected to a driver; and
a plurality of anchors fixedly securing the flexible drive members to the room, one anchor being attached to an upper portion of an inside portion of the side of the room, one anchor being attached to a lower portion of the inside portion of the side of the room, one anchor being attached to an upper portion of an outside portion of the side of the room, and, one anchor being attached to a lower portion of the outside portion of the side of the room.

* * * * *